(12) United States Patent
Mondini

(10) Patent No.: US 10,286,596 B2
(45) Date of Patent: May 14, 2019

(54) APPARATUS FOR THERMOFORMING PLASTIC CONTAINERS

(71) Applicant: IMMOBILIARE MONDINI S.P.A., Brescia (IT)

(72) Inventor: Giovanni Mondini, Cologne (IT)

(73) Assignee: MONDINI S.R.L., Brescia (IT)

(*) Notice: Subject to any disclaimer, the term of this patent is extended or adjusted under 35 U.S.C. 154(b) by 228 days.

(21) Appl. No.: 15/581,867

(22) Filed: Apr. 28, 2017

(65) Prior Publication Data
US 2017/0320259 A1  Nov. 9, 2017

(30) Foreign Application Priority Data

May 4, 2016  (IT) .......................... 102016000046027
Apr. 12, 2017 (EP) ..................................... 17166324

(51) Int. Cl.
| *B29C 51/26* | (2006.01) |
| *B29C 51/46* | (2006.01) |
| *B29C 51/02* | (2006.01) |
| *B29L 31/00* | (2006.01) |
| *B29C 51/22* | (2006.01) |

(52) U.S. Cl.
CPC ............ *B29C 51/261* (2013.01); *B29C 51/02* (2013.01); *B29C 51/46* (2013.01); *B29C 51/22* (2013.01); *B29C 51/225* (2013.01); *B29C 2793/0027* (2013.01); *B29C 2793/0081* (2013.01); *B29L 2031/712* (2013.01)

(58) Field of Classification Search
CPC .............................. B29C 51/20; B29C 51/261
See application file for complete search history.

(56) References Cited

U.S. PATENT DOCUMENTS 3,181,202 A * 5/1965 Martelli .................. B29C 51/04
                                                     264/551
3,192,800 A * 7/1965 Kostur .................... B29C 51/18
                                                     425/394
(Continued)

FOREIGN PATENT DOCUMENTS

DE          3223171 A1 * 1/1984 ........... B29C 51/261
DE     102013225646 A1 * 6/2015 ............. B29C 51/06
(Continued)

*Primary Examiner* — Timothy Kennedy
(74) *Attorney, Agent, or Firm* — Pearne & Gordon LLP

(57) ABSTRACT

An apparatus for thermoforming plastic containers comprising a pickup station (24), a feeder (25) for feeding flat sheets (8) of thermoformable plastic material to the pickup station (24) and a plurality of thermoforming devices (3) each of which in turn comprises a shaped mould (4) and a closing element (5), the shaped moulds (4) and the closing elements (5) of said plurality of thermoforming devices (3) being simultaneously movable at least between corresponding home and forming positions; the pickup station (24) comprising a positioning device (27) for, in use, positioning a plurality of flat sheets (8) arriving from the feeder (25), in a plurality of pickup locations (28), the number of pickup locations (28) being equal to the number of thermoforming devices (3); a transferring device (26) also being provided, designed to simultaneously transfer a plurality of flat sheets (8) that are positioned in the pickup locations (28) to the closing elements (5).

15 Claims, 31 Drawing Sheets

(56) References Cited

U.S. PATENT DOCUMENTS

| | | | | |
|---|---|---|---|---|
| 3,868,209 | A * | 2/1975 | Howell | B29C 43/34 264/545 |
| 4,289,469 | A * | 9/1981 | Keim | B29C 51/445 425/302.1 |
| 4,308,005 | A * | 12/1981 | Zundel | B29C 51/445 425/302.1 |
| 4,436,685 | A * | 3/1984 | Emura | B29C 31/004 264/148 |
| 4,505,774 | A * | 3/1985 | Ariga | B29C 51/16 156/499 |
| 4,832,785 | A * | 5/1989 | Cappa | B60J 10/45 118/213 |
| 4,836,764 | A * | 6/1989 | Parkinson | B29C 31/00 198/803.14 |
| 4,842,668 | A * | 6/1989 | Monetti | B29C 31/00 156/196 |
| 4,893,452 | A * | 1/1990 | Bruce | B29C 51/00 264/296 |
| 5,290,167 | A * | 3/1994 | Tanaka | B29C 51/12 156/494 |
| 5,453,237 | A * | 9/1995 | Padovani | B29C 31/00 264/153 |
| 5,658,523 | A * | 8/1997 | Shuert | B29C 43/203 264/545 |
| 5,919,496 | A * | 7/1999 | Padovani | B29C 57/12 264/296 |
| 5,980,231 | A * | 11/1999 | Arends | B29C 51/26 264/544 |
| 6,379,606 | B1 * | 4/2002 | Chun | B29C 51/18 156/285 |
| 6,398,538 | B1 * | 6/2002 | Padovani | B65G 33/04 198/465.1 |
| 6,648,043 | B1 * | 11/2003 | Kundinger | B29C 51/18 156/285 |
| 6,830,425 | B2 * | 12/2004 | Padovani | B65G 57/165 414/788.3 |
| 7,303,386 | B1 * | 12/2007 | Kundinger | B29C 51/262 271/234 |
| 7,481,640 | B1 * | 1/2009 | Jordan | B29C 51/20 425/110 |
| 2002/0127295 | A1 * | 9/2002 | Padovani | B29C 51/44 425/388 |
| 2003/0136537 | A1 * | 7/2003 | Frederiksen | B29C 51/165 162/224 |
| 2004/0178543 | A1 * | 9/2004 | Fitzell, Jr. | B29C 51/261 264/545 |
| 2006/0011290 | A1 * | 1/2006 | Geiss | B29C 51/267 156/245 |
| 2006/0113716 | A1 * | 6/2006 | Binda | B29C 51/267 264/545 |
| 2008/0131244 | A1 * | 6/2008 | Murray | B65B 5/022 414/373 |
| 2009/0241485 | A1 * | 10/2009 | Buchko | B29C 51/04 53/543 |
| 2010/0126901 | A1 * | 5/2010 | Cerf | B29C 51/12 206/564 |
| 2010/0140831 | A1 * | 6/2010 | Ondracek | B29C 51/10 264/163 |
| 2011/0071009 | A1 * | 3/2011 | Bartoli | B65B 9/042 493/52 |
| 2011/0120282 | A1 * | 5/2011 | Benker | B26D 7/27 83/109 |
| 2011/0277926 | A1 * | 11/2011 | Polk, Jr. | B29C 43/04 156/245 |
| 2013/0020743 | A1 * | 1/2013 | Rapaport | B29C 51/105 264/511 |
| 2013/0049250 | A1 * | 2/2013 | Cooper | B26F 1/40 264/138 |
| 2013/0078334 | A1 * | 3/2013 | Benedetti | B29C 51/18 425/526 |
| 2015/0174815 | A1 * | 6/2015 | Izquierdo Ereno | B29C 51/087 264/39 |

FOREIGN PATENT DOCUMENTS

| | | | |
|---|---|---|---|
| GB | 2134033 A | 8/1984 | |
| JP | 58033421 A * | 2/1983 | B29C 51/18 |
| JP | 58094419 A * | 6/1983 | B29C 31/004 |
| WO | 2011/151374 A1 | 12/2011 | |

* cited by examiner

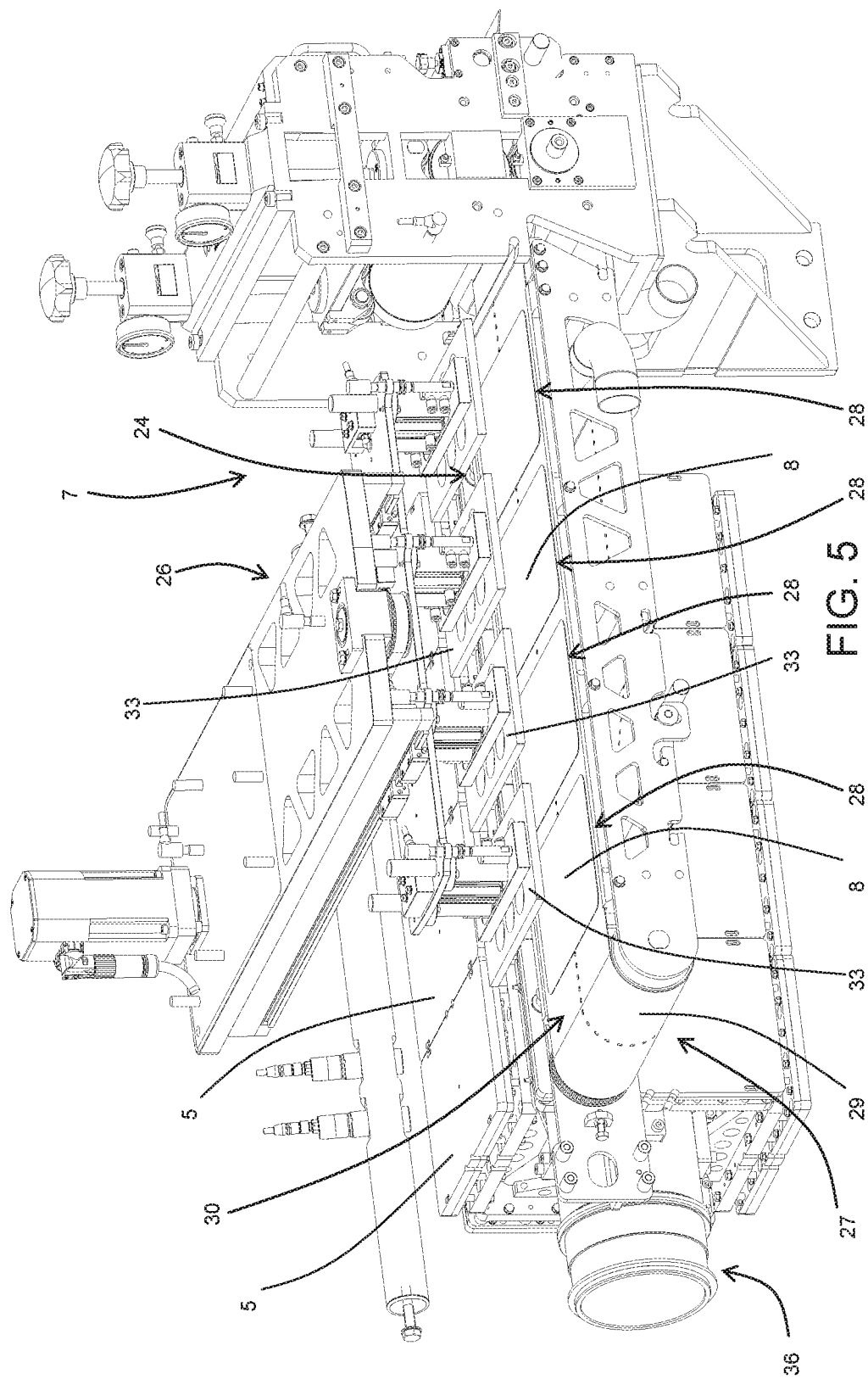

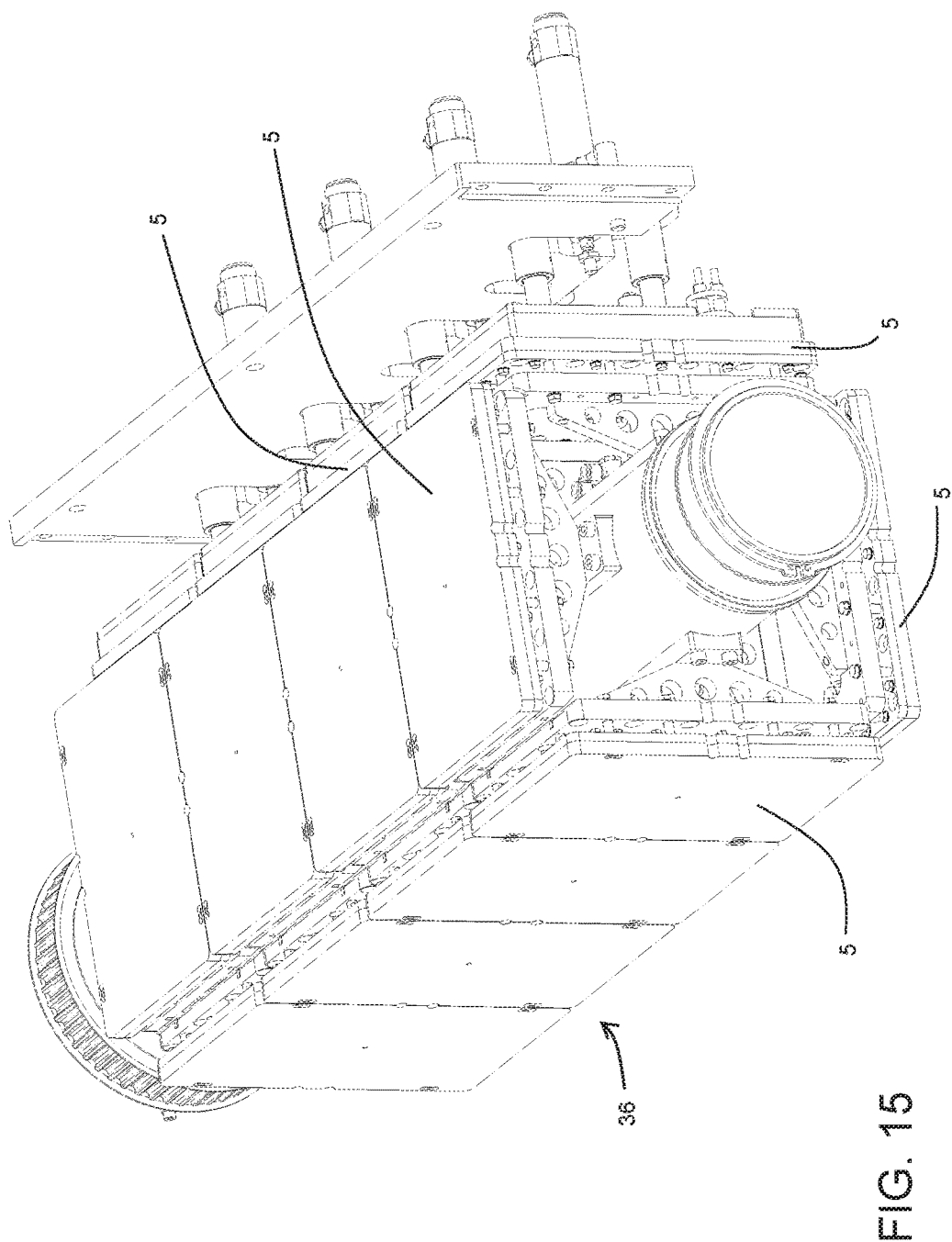

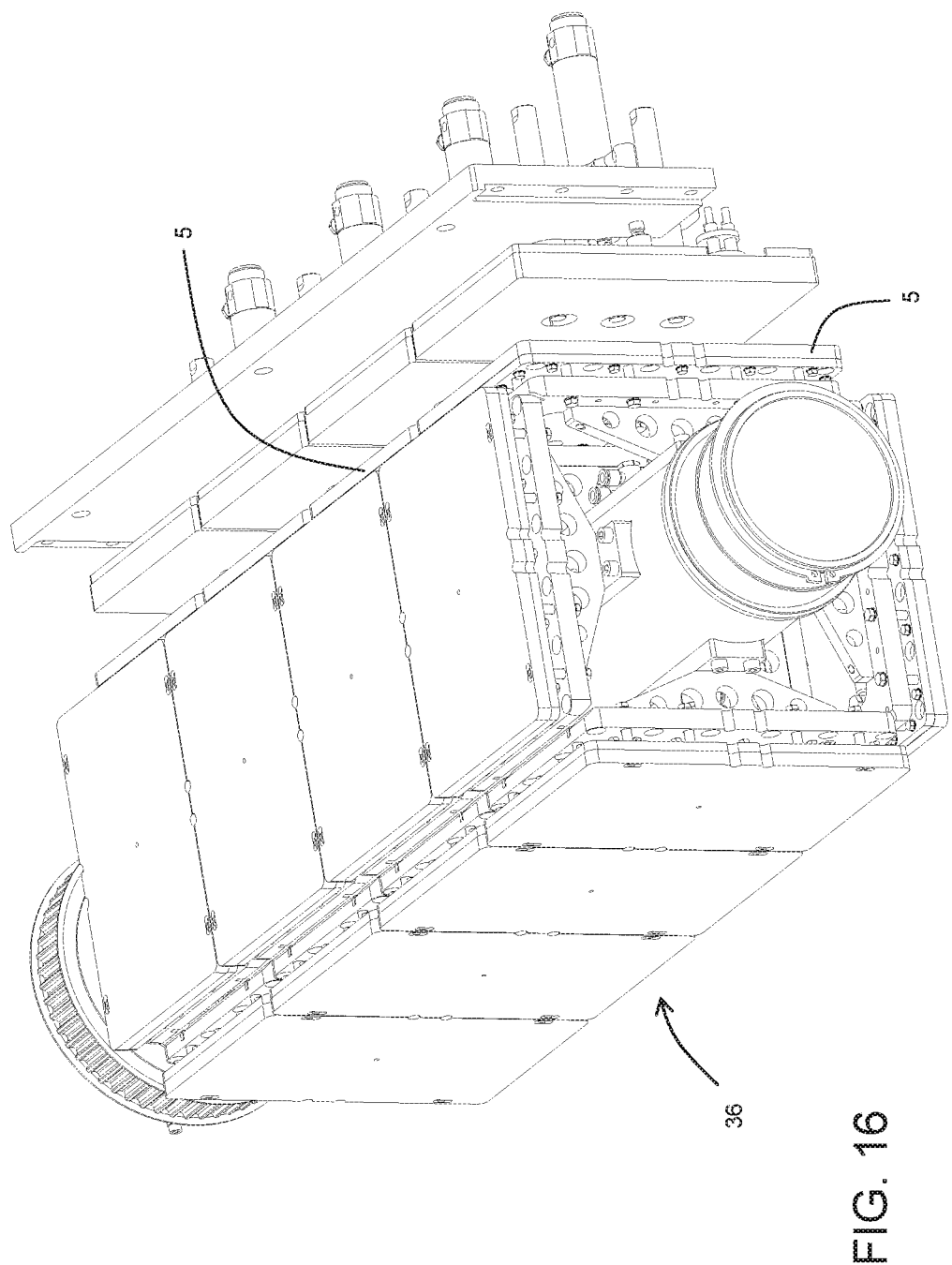

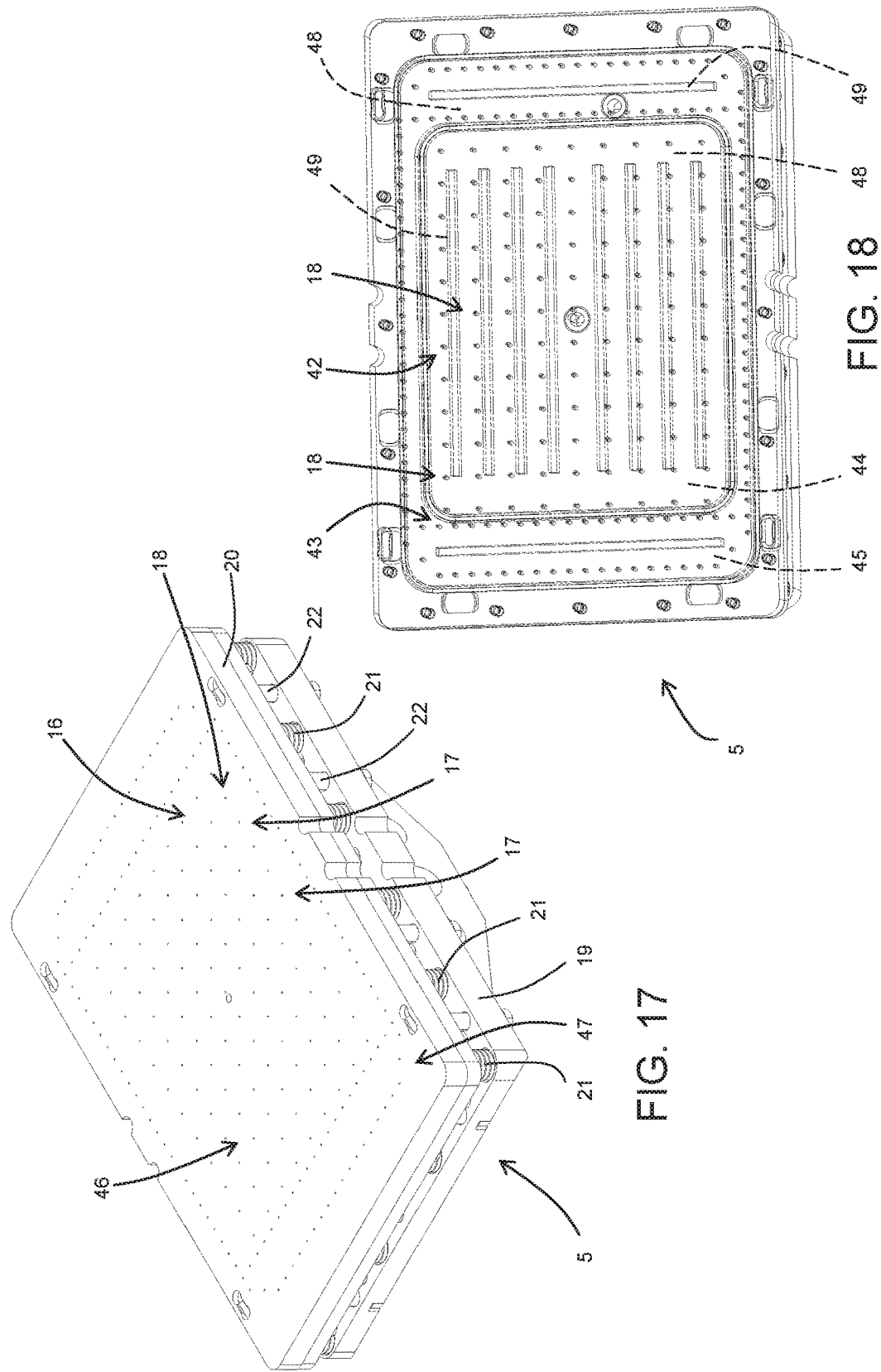

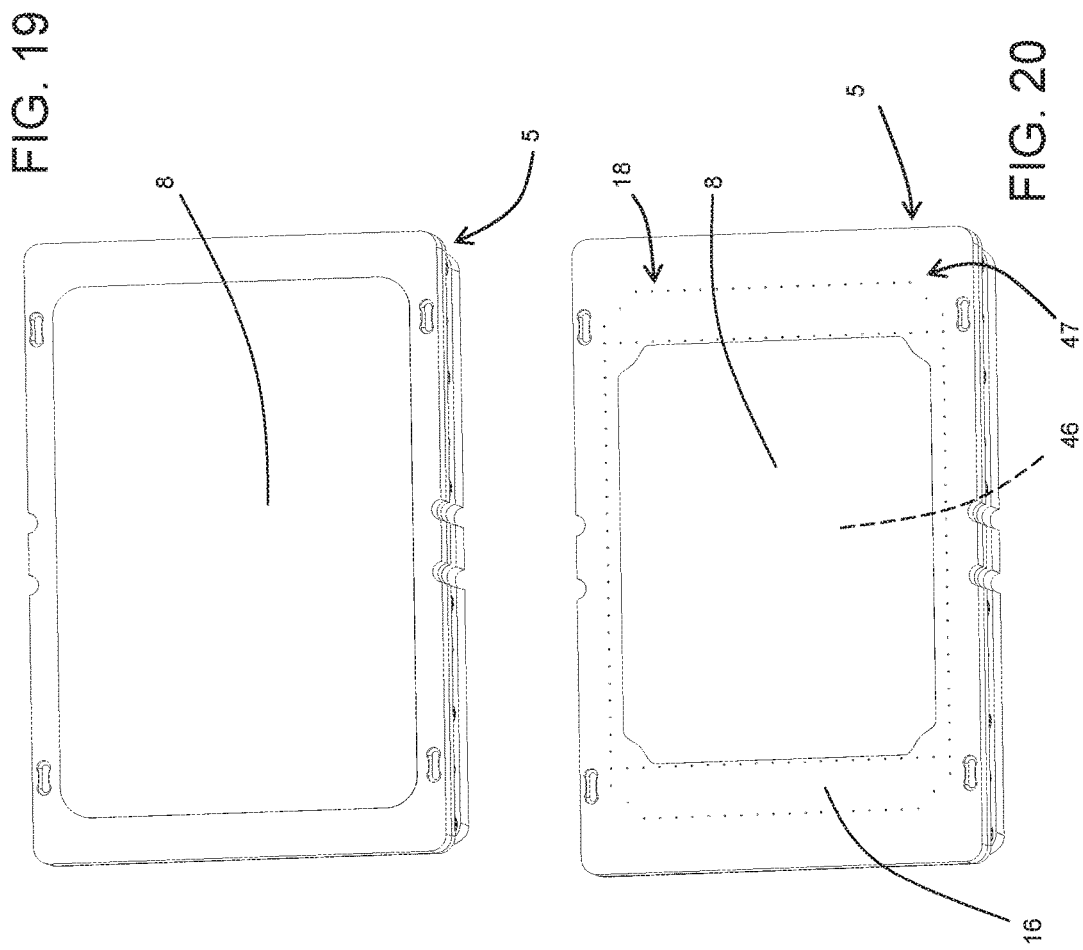

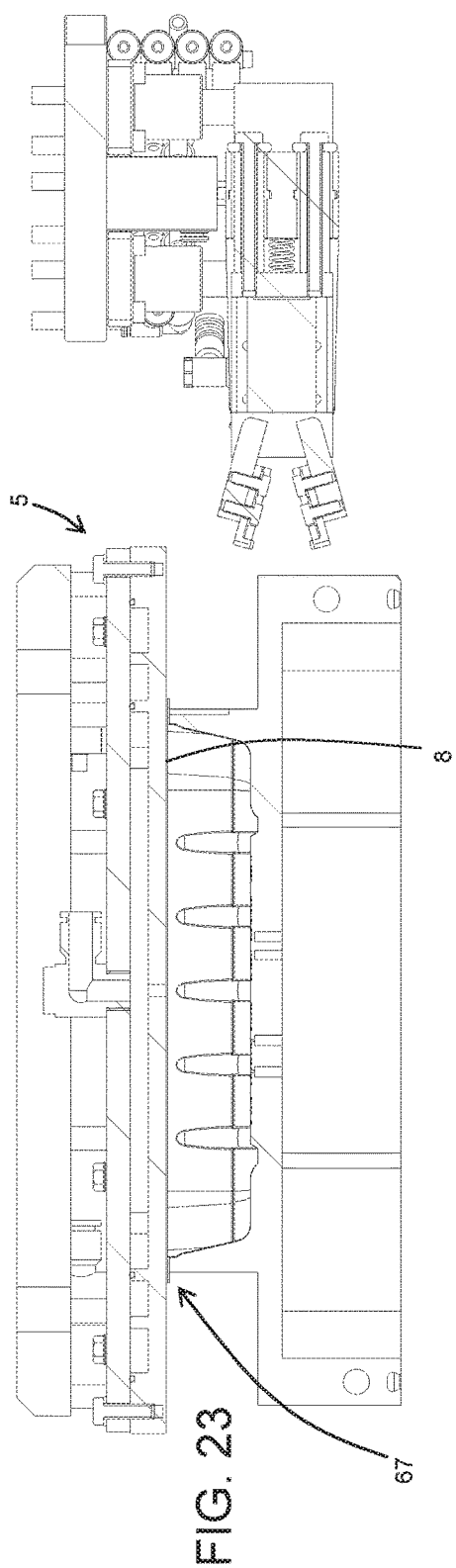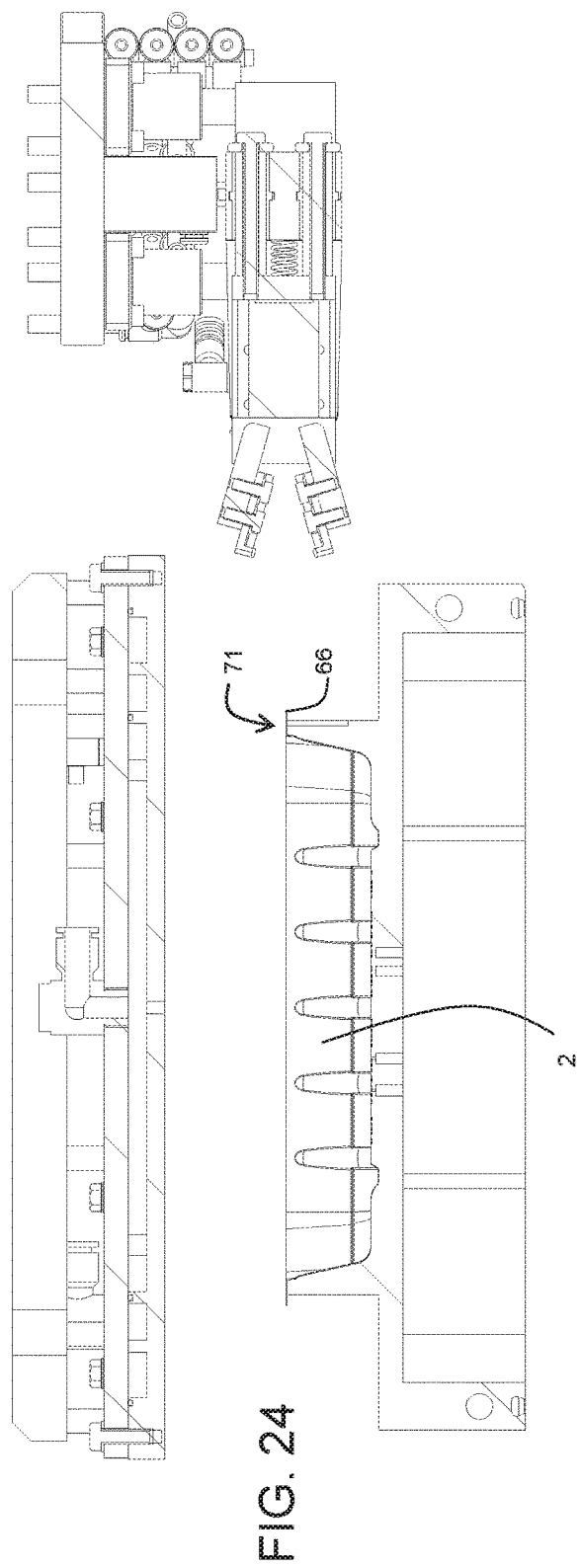

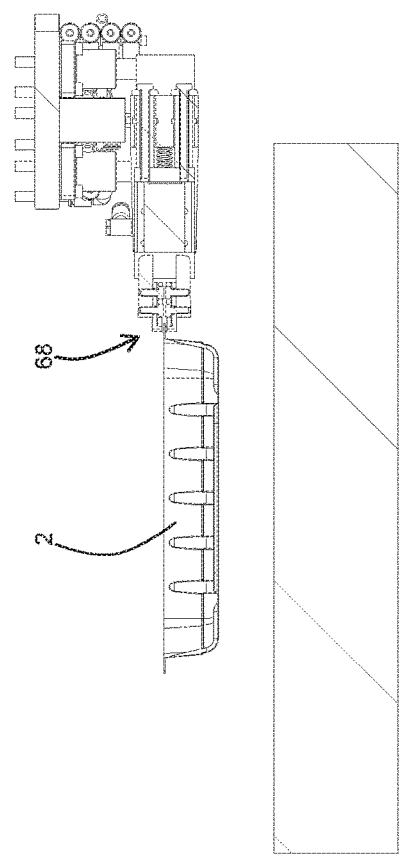
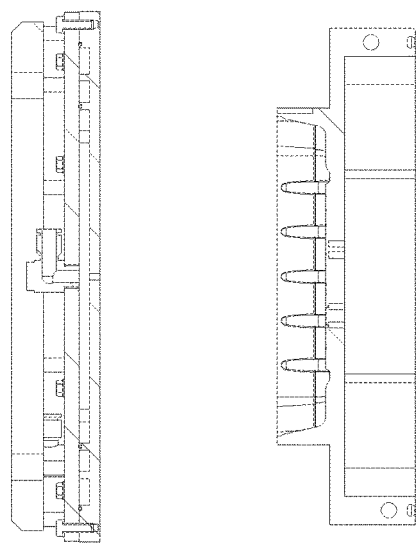
FIG. 28

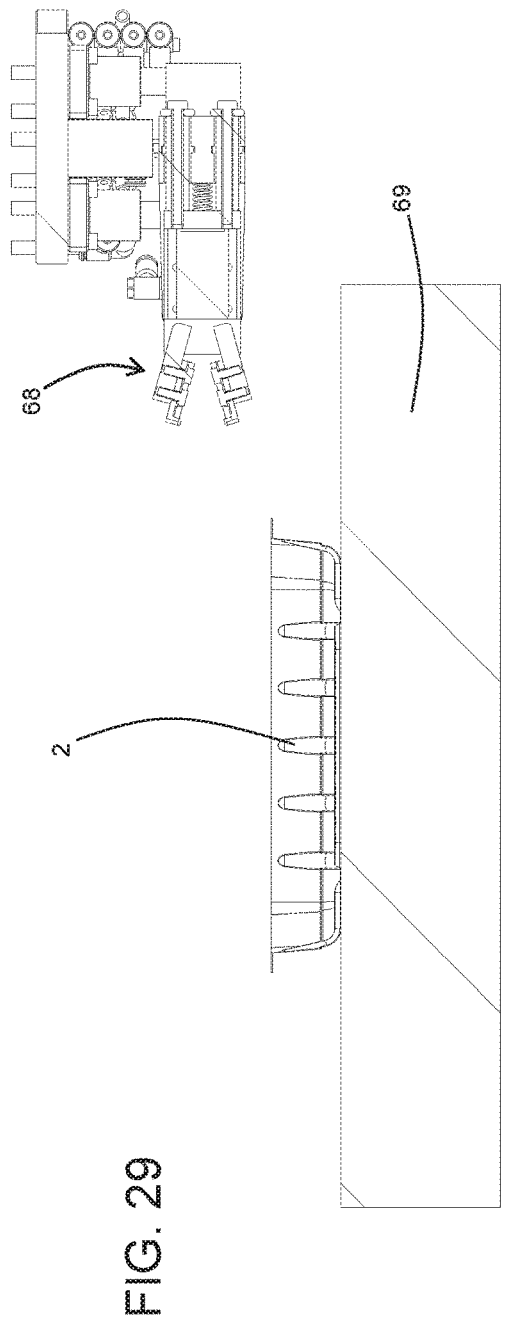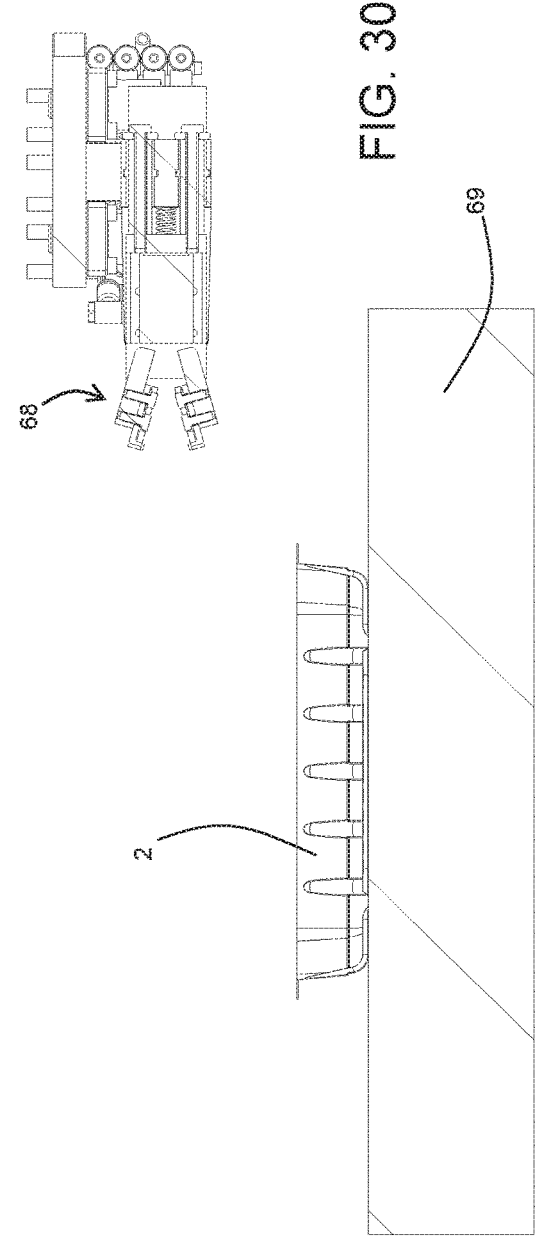

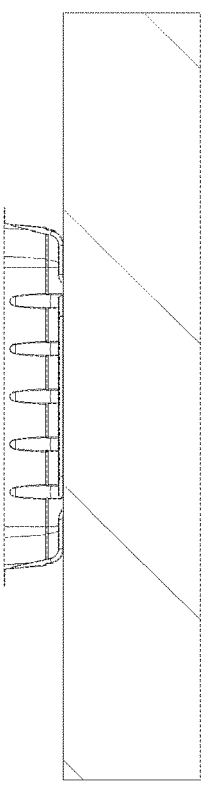
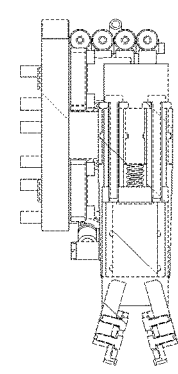
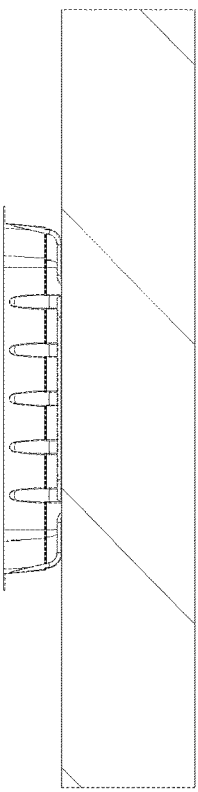
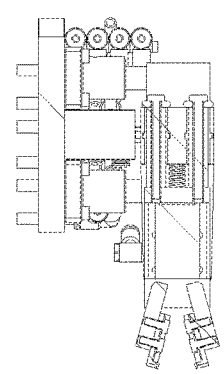
FIG. 31
FIG. 32
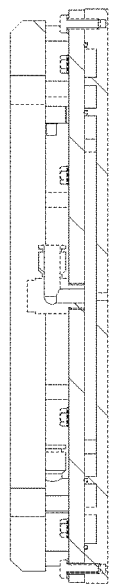
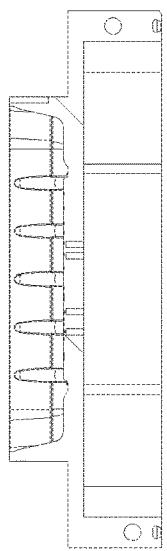
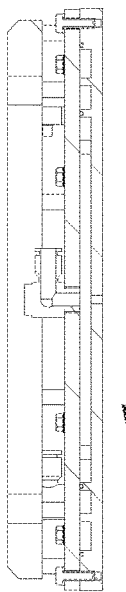
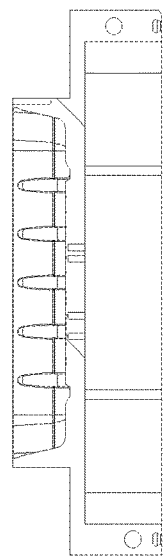

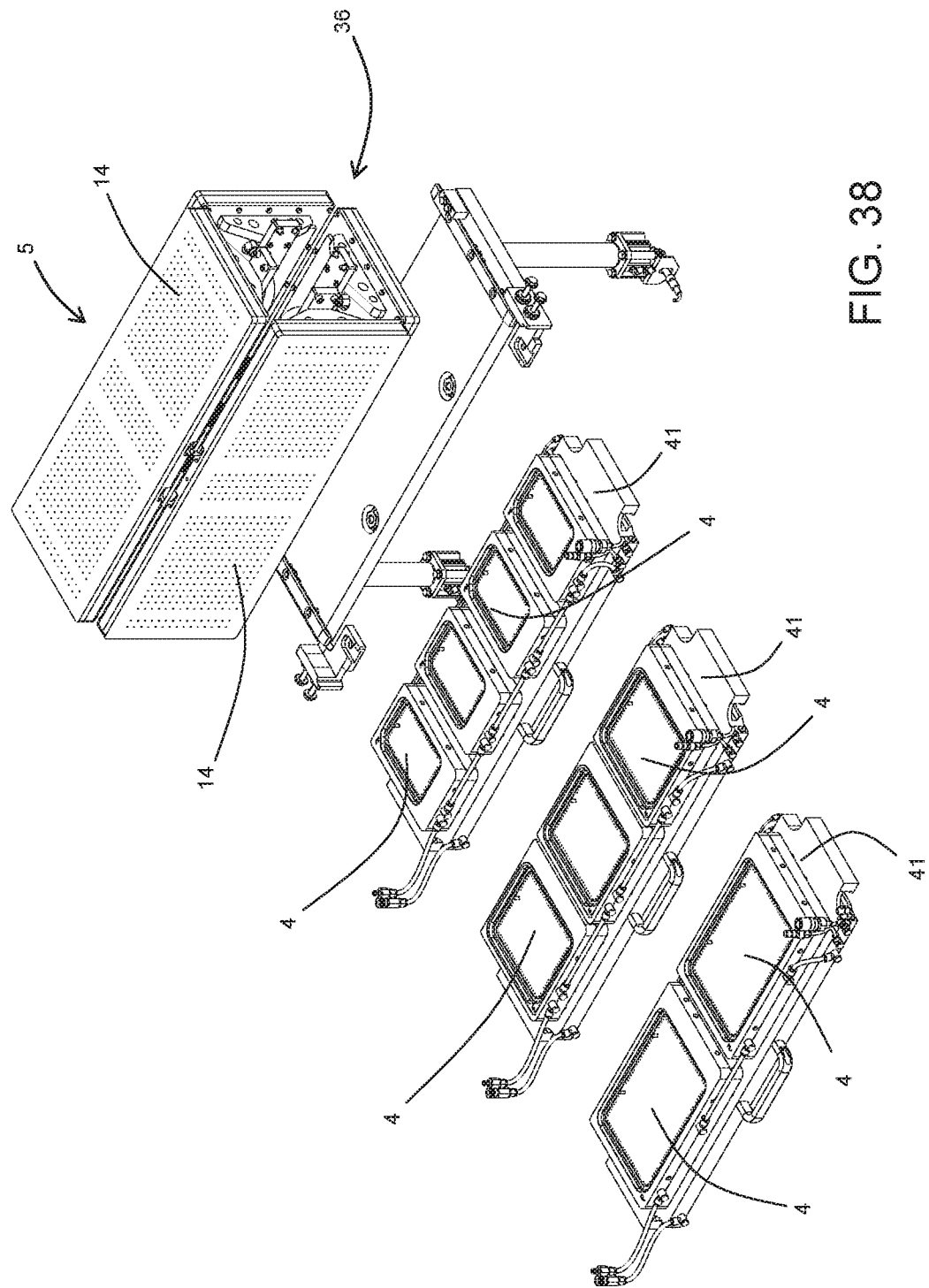

APPARATUS FOR THERMOFORMING PLASTIC CONTAINERS

This invention relates to an apparatus for thermoforming plastic containers, in particular an apparatus for thermoforming plastic containers that is mountable directly in a line with the plants intended to then use the containers.

In general, the apparatus which is the subject matter of this invention is advantageously applied in the food sector, in which many products are usually packaged in sealed packages, constituted of a lower container made of plastic material and having the shape of a tray or tub, with a perimetric flange that extends outwards, to which a protective film, also made of plastic, is fixed.

Depending on requirements, both the container and the protective film may be constituted either of material that is permeable to oxygen, or of material that is impermeable to oxygen (this solution being of interest when packaging in a controlled atmosphere).

Patent application WO 2011/151374 A1 on one hand supplies an overview of prior art forming machines, and on the other hand describes a forming machine intended to be used in the same context as the apparatus according to this invention, that is to say, for forming containers directly in a line with the plants that are intended to use them.

In fact, this type of application is particularly advantageous because on one hand it minimises production transport costs compared with applications in which a manufacturer thermoforms the containers in a place different to the place where the containers must then be used, and on the other hand it is suitable for more versatile use, since it does not require the availability of stocks of containers of every possible size required.

In the case of the apparatus described in WO 2011/151374 A1, a thermoforming device is provided that comprises a shaped mould and a closing element for closing the shaped mould. A flat sheet of thermoformable plastic material is positioned on the closing element (equipped with a suction retaining system) and once the closing element is coupled with the shaped mould, is thermoformed. After the forming, the shaped mould is uncoupled from the closing element and is made to rotate until it is at a releasing station, where the container is either ejected from the shaped mould onto a conveyor, or picked up by a suction head that then transfers it to the conveyor.

In order to be able to increase plant productivity, the apparatus also comprises at least two shaped moulds that are alternately brought to the forming station and the releasing station, as well as a plurality of closing elements.

The latter are mounted on a rotor that, by means of a rotation of approximately 270° brings them from a receiving station for receiving a flat sheet of thermoformable plastic material, to the forming station where the shaped mould is clamped on them. During the rotation, the closing elements, which are internally equipped with suitable heating means, heat the flat sheet to the temperature necessary for thermoforming. In order to maximise the productivity of the apparatus and to limit down times, four closing elements are mounted on the rotor, said closing elements being angularly spaced by approximately 90° relative to the axis of rotation.

The feeding of each flat sheet to a closing element takes place by means of a suction transferring device which picks them up at a pickup station substantially constituted of one end of a stack of flat sheets.

Therefore, although there are prior art apparatuses that allow thermoformed containers to be produced directly in a line with the plants intended to use them, they are not free of disadvantages.

A first disadvantage of prior art apparatuses of this type is rather limited productivity, which, as described in WO 2011/151374 A1, may necessitate the use of multiple apparatuses in parallel in order to meet production requirements, with a considerable increase in installation costs, operating costs and overall dimensions.

A second disadvantage, if using a rotary rotor, is very complex construction of the rotor due to the need to provide each closing element mounted on the rotor with an independent heating system.

A further disadvantage is limited versatility of the apparatus, which is not really suitable for container size changeovers. In fact, to use the same apparatus for making containers having a different shape, not only do all of the shaped moulds have to be substituted and the flat sheet feeding system adapted, but it is also necessary to remove from the stack any remaining flat sheets in the preceding size and insert flat sheets of the correct size. Even extraction of the formed containers from the mould is relatively complex and results in the need to have available a plurality of moulds for each thermoforming device.

Last but not least, the closing elements used in the prior art for allowing the use of a single closing element for the production of different container sizes (with concentric movable parts), are particularly complex in terms of construction, as well as being difficult to clean if the apparatus malfunctions. In this context, the technical purpose which forms the basis of this invention is to provide an apparatus for thermoforming plastic containers that overcomes the above-mentioned disadvantages.

In particular, the technical purpose of this invention is to provide an apparatus for thermoforming plastic containers that can guarantee higher productivity than similar prior art apparatuses.

The technical purpose specified and the aims indicated are substantially achieved by an apparatus for thermoforming plastic containers as described in the appended claims.

Further features and the advantages of this invention are more apparent in the detailed description below, with reference to several preferred, non-limiting embodiments of an apparatus for thermoforming plastic containers, illustrated in the accompanying drawings, in which:

FIG. 5 is an axonometric front view of a combination of several main parts of the apparatus of FIG. 1, which operate in conjunction with each other for performing several operating steps of the apparatus, during a first operating step;

FIG. 15 is an axonometric rear three-quarter view of a further combination of main parts of the apparatus of FIG. 1, which operate in conjunction with each other during several operating steps, in a respective first configuration relative to each other;

FIG. 16 shows the combination of main parts of FIG. 15 in a second configuration relative to each other;

FIG. 17 is an axonometric view of a detail of a closing element of a thermoforming device that is part of the apparatus of FIG. 1 and visible in particular in FIGS. 15 and 16;

FIG. 18 shows the closing element of FIG. 17 in a different axonometric view and partly transparent, for highlighting its inner structure;

FIGS. 19 and 20 show the closing element of FIG. 18 not transparent and with two different flat sheets retained on it;

FIG. 21 is a partly transparent axonometric view of a detail of a heating element that is part of the apparatus of FIG. 1 and visible in particular in FIGS. 15 and 16;

FIGS. 22 to 32 are orthogonal side views from the right (with reference to what is illustrated in FIG. 12), with some parts cut away to better illustrate others, of a sequence of operating steps of the combination of parts illustrated in FIG. 12;

FIG. 38 is an axonometric view of an alternative embodiment of a thermoforming device of the machine of FIG. 1, highlighting three different interchangeable parts;

Figure 1:
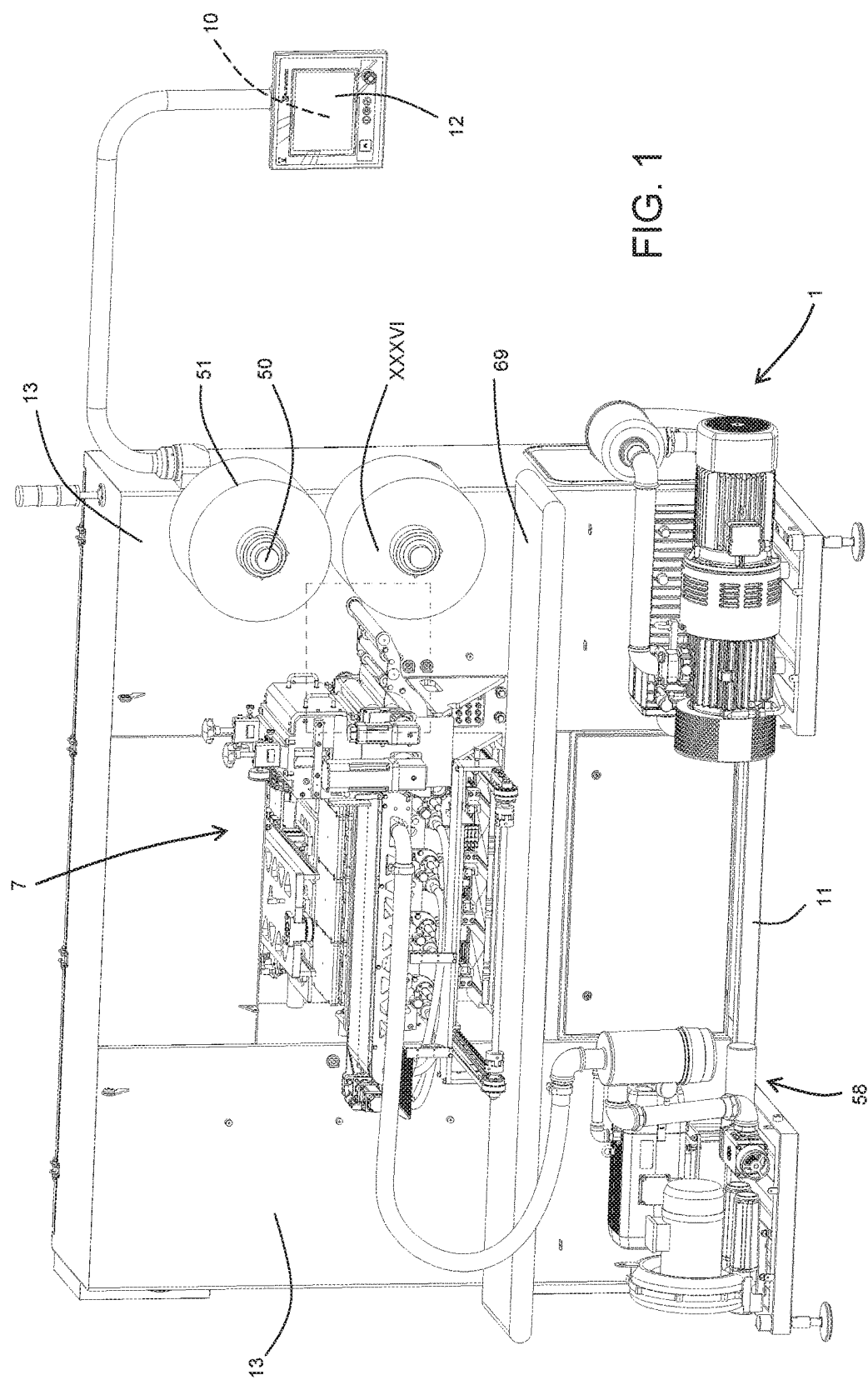
FIG. 1 is an axonometric front view of an apparatus made according to this invention.
Figure 2:
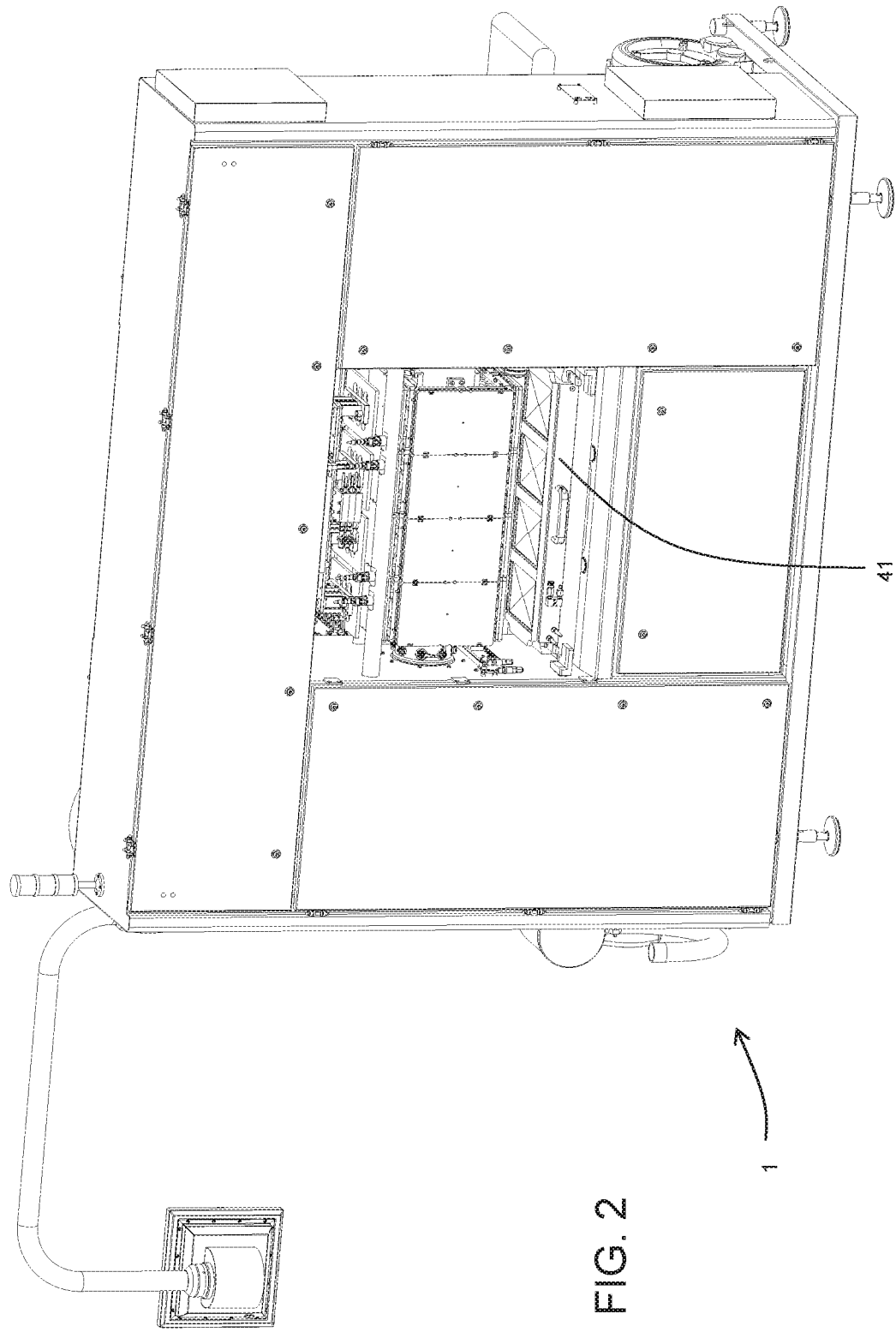
FIG. 2 is an axonometric rear view of the apparatus of FIG. 1.
Figure 4:
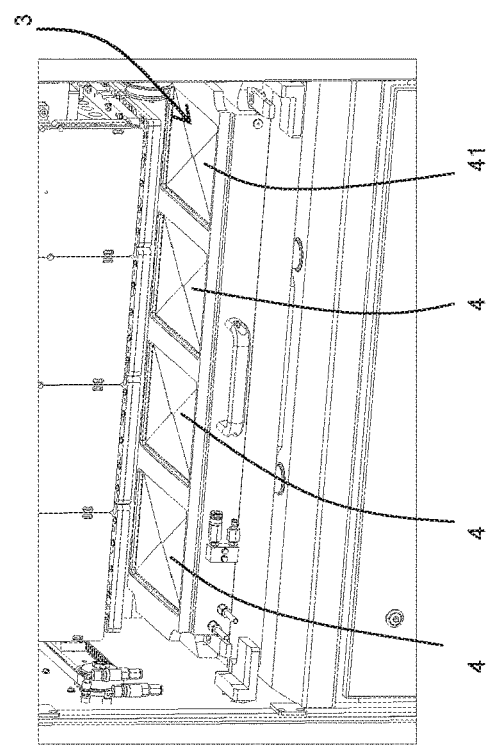
FIG. 4 illustrates the detail IV of FIG. 2.

With reference to the accompanying drawings, the numeral 1 denotes in its entirety an apparatus for thermoforming plastic containers 2 in accordance with this invention.

As will become apparent from the detailed description that follows, the apparatus 1 developed by the Applicant has at least five different innovative aspects, each of which may advantageously be applied either together with one or more of the others (together with all of the others in the preferred embodiment of the apparatus 1 described herein), or on its own in apparatuses that do not have any of the other innovative aspects. Consequently, although the appended claims are intended to independently protect only one of the innovative aspects of the apparatus 1, the Applicant as of now reserves the right to in future protect the other innovative aspects independently by filing specific divisional patent applications.

In all of the possible innovative variants, the apparatus 1 in general comprises:
- at least one thermoforming device 3 that in turn comprises a shaped mould 4 and a closing element 5;
- one or more heating elements 6 for heating the closing element 5;
- feeding means 7 for feeding flat sheets 8 of thermoformable plastic material to the closing element 5;
- an extracting device 9 for extracting the thermoformed container 2 from the shaped mould 4; and
- an electronic unit 10 for controlling and checking operation of the apparatus 1.

All of the various parts of the apparatus 1 are supported by a supporting frame 11. Control panels 12, electrical and pneumatic cabinets 13 and in general devices in themselves of the known type and therefore not described in detail are also present.

Figure 22:
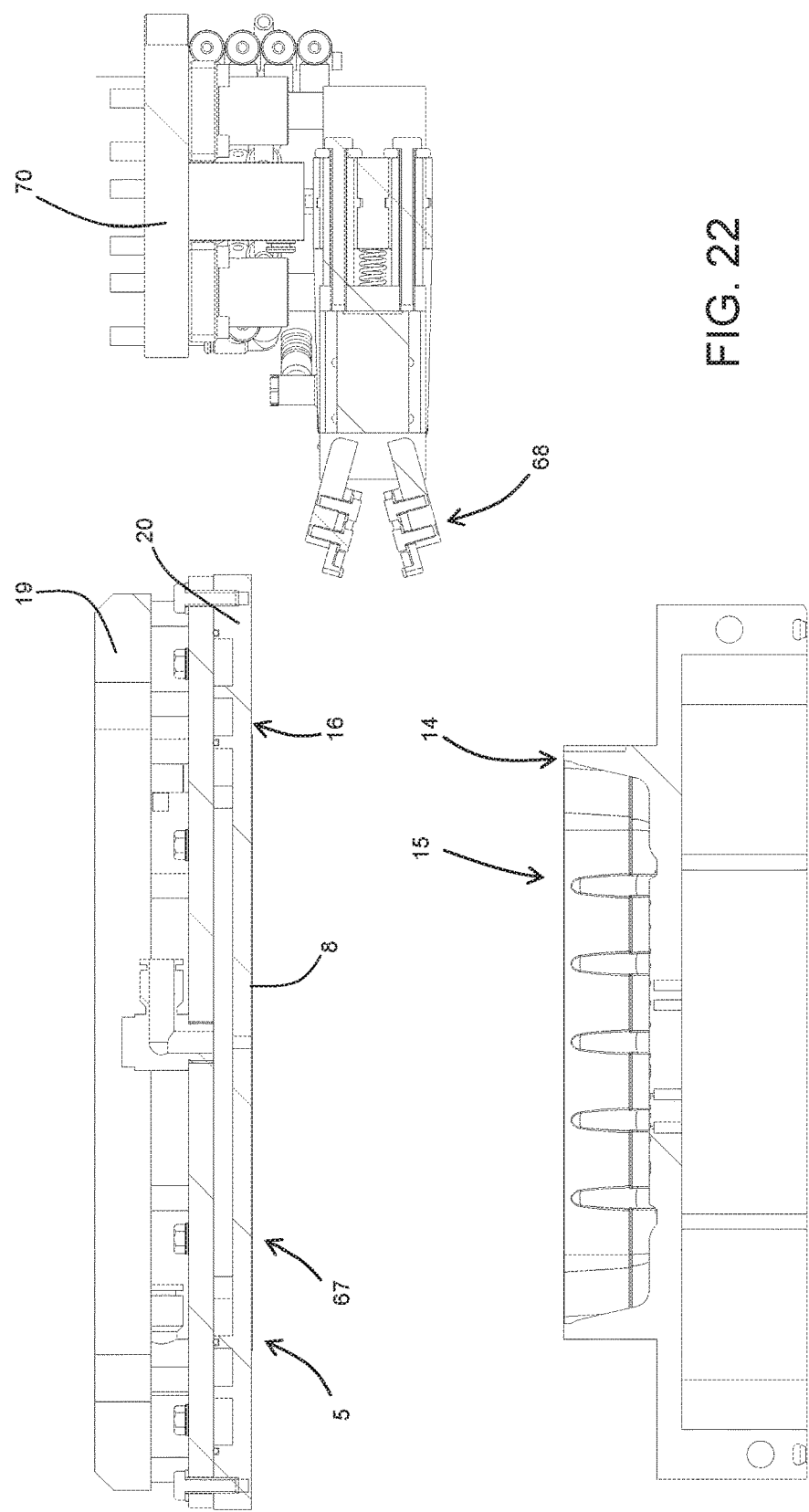

The shaped mould 4 and the closing element 5 of the thermoforming device 3 are movable relative to one another at least between a home position, in which they are away from one another, and a forming position, in which they are near to each other and in which, in use, they can clamp a flat sheet 8 between them. In the embodiment illustrated the shaped mould 4 and the corresponding closing element 5 which are positioned in the home position, are shiftable into the forming position by means of a movement of the shaped mould 4 towards the closing element 5 (FIGS. 22 and 23). Similarly, inverse shifting towards the forming position occurs by means of a movement of the shaped mould 4 away from the closing element 5 (FIGS. 23 and 24).

In the known way, the shaped mould 4 has an inner surface whose shape matches that of the container 2 to be obtained, in which several small holes are made (not visible in the accompanying figures) for removing air during forming. The top of the shaped mould 4 comprises a perimetric edge 14, preferably flat, that surrounds an upper opening 15.

In turn, the closing element 5 comprises a resting surface 16, preferably flat, that is intended to face the shaped mould 4 at least when they are in the forming position, a position in which the closing element 5 closes the upper opening 15 of the shaped mould 4 and in which, preferably, the flat sheet 8 is locked between the resting surface 16 and the perimetric edge 14. The closing element 5 is also equipped with suction means designed to retain on the resting surface 16 at least one flat sheet 8, at least when the shaped mould 4 and the closing element 5 are in the home position. In general, the suction means (which in general must guarantee that the flat sheets 8 adhere in the best possible way to the resting surface 16 so that they can be heated as evenly as possible) comprise a plurality of suction holes 17 made in the closing element 5, and each suction hole 17 comprises a suction inlet 18 positioned at the resting surface 16 (it should be noticed that, for the sake of simplicity, the suction holes 17 and the related suction inlets 18 are only illustrated in FIGS. 17, 18 and 20, but they must be considered present in all of the closing elements 5).

Moreover, advantageously, in the embodiment illustrated in FIG. 17, each closing element 5 comprises a supporting structure 19 and an operating structure 20. The operating structure 20 is connected to the supporting structure 19 by springs 21 for allowing the operating structure to move towards the supporting structure 19 following the pressure applied, in use, by the shaped mould 4, and for simultaneously allowing compensation of any lack of planarity between the resting surface 16 and the perimetric edge. However, for guiding the movements relative to each other, the operating structure 20 comprises a plurality of guiding elements 22 slidably coupled the supporting structure 19.

Figure 39:
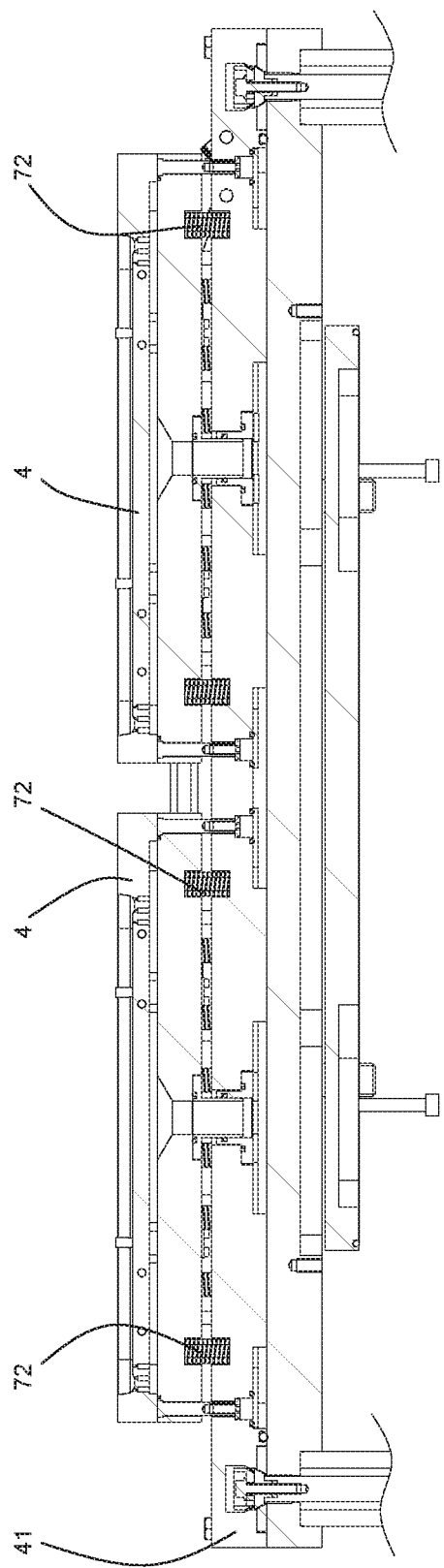
FIG. 39 is a vertical axial section of the lower part of the thermoforming device of FIG. 38 with the left-hand interchangeable part of that Figure mounted.

In other embodiments, such as that illustrated in FIGS. 38 and 39, in contrast at least two of the closing elements 5 which are simultaneously movable between the corresponding home and forming positions, may be constituted of a single rigid element 14, such as a flat body. Preferably, all of the closing elements 5 which are simultaneously movable between the corresponding home and forming positions, are constituted of that single rigid element 14.

In the known way, the thermoforming device 3, and in particular the holes of the shaped mould 4 and the suction holes 17 of the closing element 5 are also associated with pneumatic means designed, in use, to create a negative pressure between the flat sheet 8 and the shaped mould 4 and/or an overpressure between the flat sheet 8 and the closing element 5, in such a way as to cause the previously heated flat sheet 8 to adhere to the inner surface of the shaped mould 4.

Hereinafter, first the various innovative elements of the apparatus 1 are described separately, followed by an overview of operation of the apparatus 1 which, according to the preferred embodiment, includes all of those elements.

According to a first inventive aspect, the apparatus 1 is structured in such a way as to allow simultaneous thermoforming of a plurality of containers 2. For that purpose, first, the feeding means 7 comprise a pickup station 24, a feeder 25 for feeding flat sheets 8 to the pickup station 24 (which may or may not be of the innovative type described below), and a transferring device 26 for transferring the flat sheets 8 from the pickup station 24 to the closing element 5.

Furthermore, the apparatus 1 comprises a plurality of thermoforming devices 3 which are advantageously substantially identical to each other. In fact, each thermoforming device 3 in turn comprises a shaped mould 4 and a closing element 5, and the shaped moulds 4 and the closing elements 5 of the entire plurality of thermoforming devices 3 are simultaneously movable at least between the corresponding home and forming positions.

Furthermore, at least when they are in the home position (and they are not subjected to stress by the related shaped moulds 4), the closing elements 5 of the plurality of thermoforming devices 3 have first mutual positions that are substantially fixed and predetermined. In particular, in the preferred embodiment they are side by side, as described in more detail below.

In turn, the pickup station 24 comprises a positioning device 27 able, in use, to position a plurality of flat sheets 8 arriving from the feeder 25 in a plurality of separate pickup locations 28. The number of pickup locations 28 is equal to the number of thermoforming devices 3, and the pickup locations 28 are mutually arranged with second mutual positions. Moreover, preferably, the second mutual positions correspond to the first mutual positions of the closing elements 5. That definition means that the (vectorial) distances between the centres of the pickup locations 28 are identical (subject to production tolerances) to those between the centres of the closing elements 5. Advantageously, the positioning device 27 is also such that it always positions the flat sheets 8 so that they are centred relative to the related pickup location 24, so that they are also centred on the related closing element 5.

Figure 7:
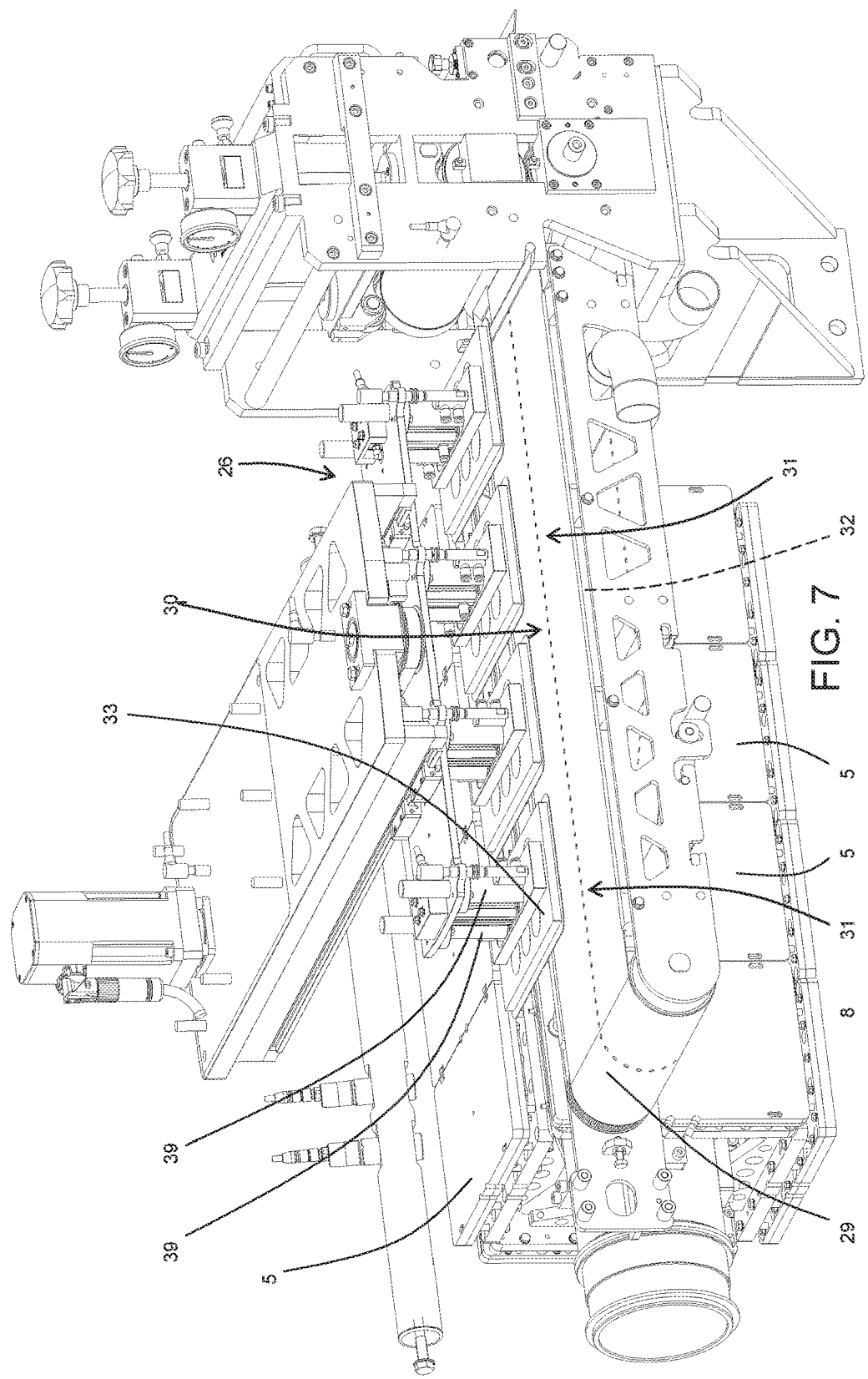

In the preferred embodiment, the positioning device 27 comprises at least one belt with controlled feed 29 which is synchronised with the feeder 25 and which comprises an upper portion 30 on which the pickup locations 28 are defined. At least at that upper portion 30 the belt with controlled feed 29 is advantageously a suction belt. As shown in FIG. 7, in the embodiment illustrated the suction belt has a series of through holes 31 at its centre line, and at the upper portion 30 it is supported by a single negative pressure chamber 32 extending under all of the pickup locations 28 (advantageously in this case, in order to make the suction effective even with a single flat sheet 8 positioned on the suction belt, the negative pressure is created with low head and high flow rate).

As shown in FIG. 5, the pickup locations 28 are preferably positioned one after another along a line of feed of the belt with controlled feed 29 and are constituted of predetermined stretches along the line of feed of the belt (not of specific parts of its surface; in other words, what counts is not a particular portion of the surface of the suction belt, but the part of the surface which at that moment is in the correct position).

As indicated, the correct positioning of the flat sheets 8 in the pickup locations 28 is obtained by synchronising the feeding of the belt with controlled feed 29 and the feeder 25 located upstream. The feeding sequence is illustrated by the sequence of FIGS. 7, 8, 9, 10 and 5. Each time the feeder 25 feeds a flat sheet 8 according to a feeding plane that is parallel to the upper portion 30 of the belt with controlled feed 29, the latter is fed with a speed identical to that of the flat sheet 8 until the flat sheet 8 is completely on it. Then, before accepting the next flat sheet 8, the belt feeds the flat sheet just loaded until it has created between the two flat sheets 8 the correct distance allowing the two flat sheets 8 to each be in the correct pickup location 24 at the end of loading of all of the flat sheets 8, Loading of the next flat sheet 8 causes feeding of the flat sheet 8 previously loaded towards the next pickup location 24 and so on. Moreover, in the preferred embodiment, the distance between the various pickup locations 28 is therefore constant.

Figure 6:
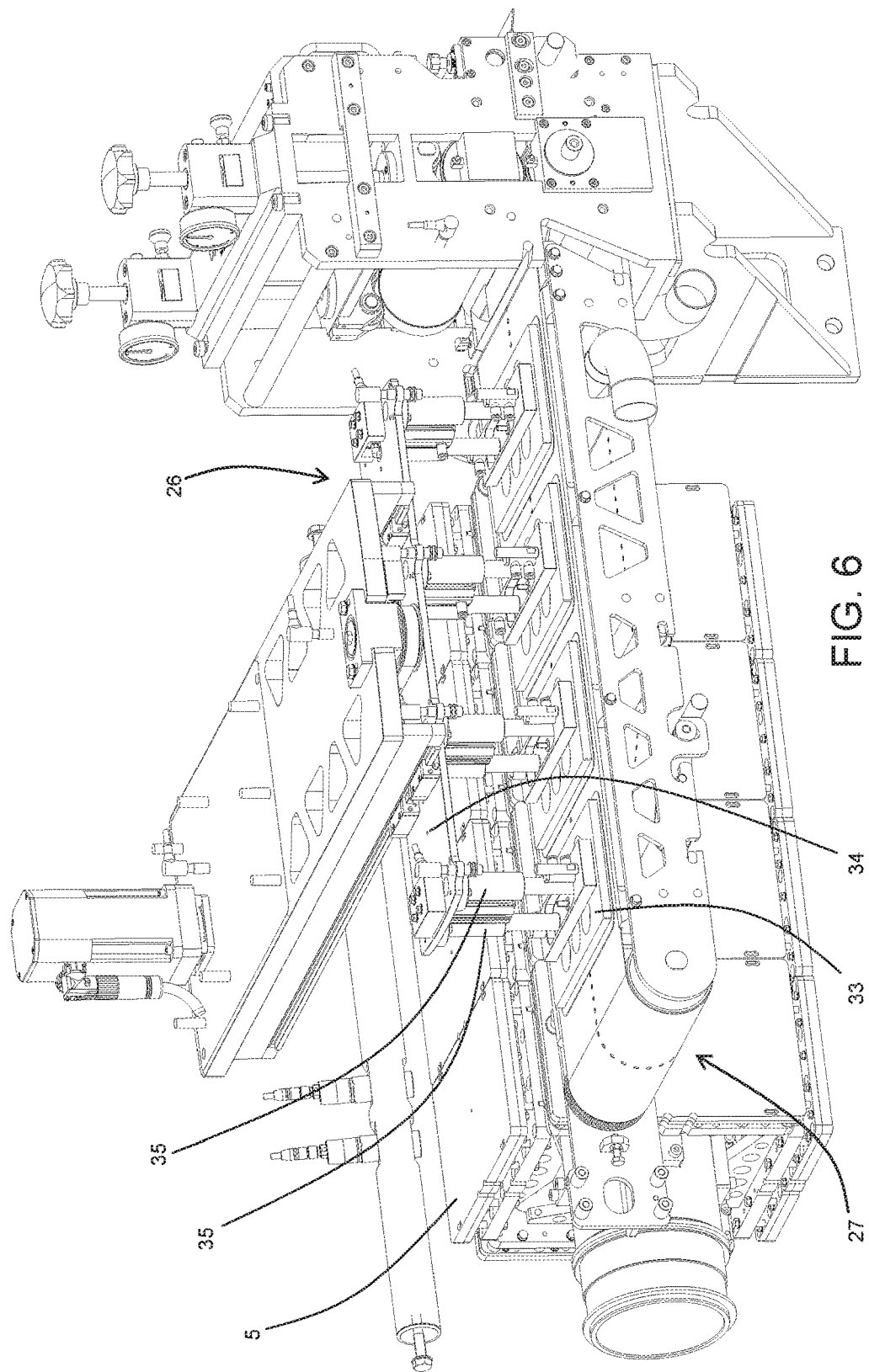
FIGS. 6 to 10 are axonometric front views of a sequence of successive operating steps of the combination of main parts of the apparatus of FIG. 5.

The transferring device 26 is then designed to simultaneously transfer the plurality of flat sheets 8 positioned in the pickup locations 28 to the closing elements 5. In the preferred embodiment, the transferring device 26 comprises a plurality of pierced suction plates 33 which are movable between a pickup position in which they are facing the pickup station 24 (FIG. 6), and a releasing position (FIG. 9) in which they are facing the closing elements 5. However, in other embodiments the transferring device 26 may comprise a single pierced suction plate 33. In more detail, in the embodiment illustrated, the shifting of the (one or more) pierced suction plates 33 between the pickup position and the releasing position involves first a shifting of the pierced suction plates 33 relative to their first supporting slide 34 away from the suction belt (along a vertical line in FIG. 7), then a translation of the first supporting slide 34 towards the closing elements 5 (along a horizontal line in FIG. 8) and finally a shifting of the pierced suction plates 33 relative to their supporting slide 34 towards the closing elements 5 (along a vertical line in FIG. 9). Both the shifting away from the suction belt and the shifting towards the closing elements 5 are obtained by means of fluid actuators 35 that connect the pierced suction plates 33 to the first supporting slide 34.

Moreover, in the preferred embodiment, the apparatus 1 also comprises a rotor 36 rotatable about an axis of rotation (horizontal in the accompanying figures, although it does not have to be) on which the closing elements 5 are mounted.

Figure 9:
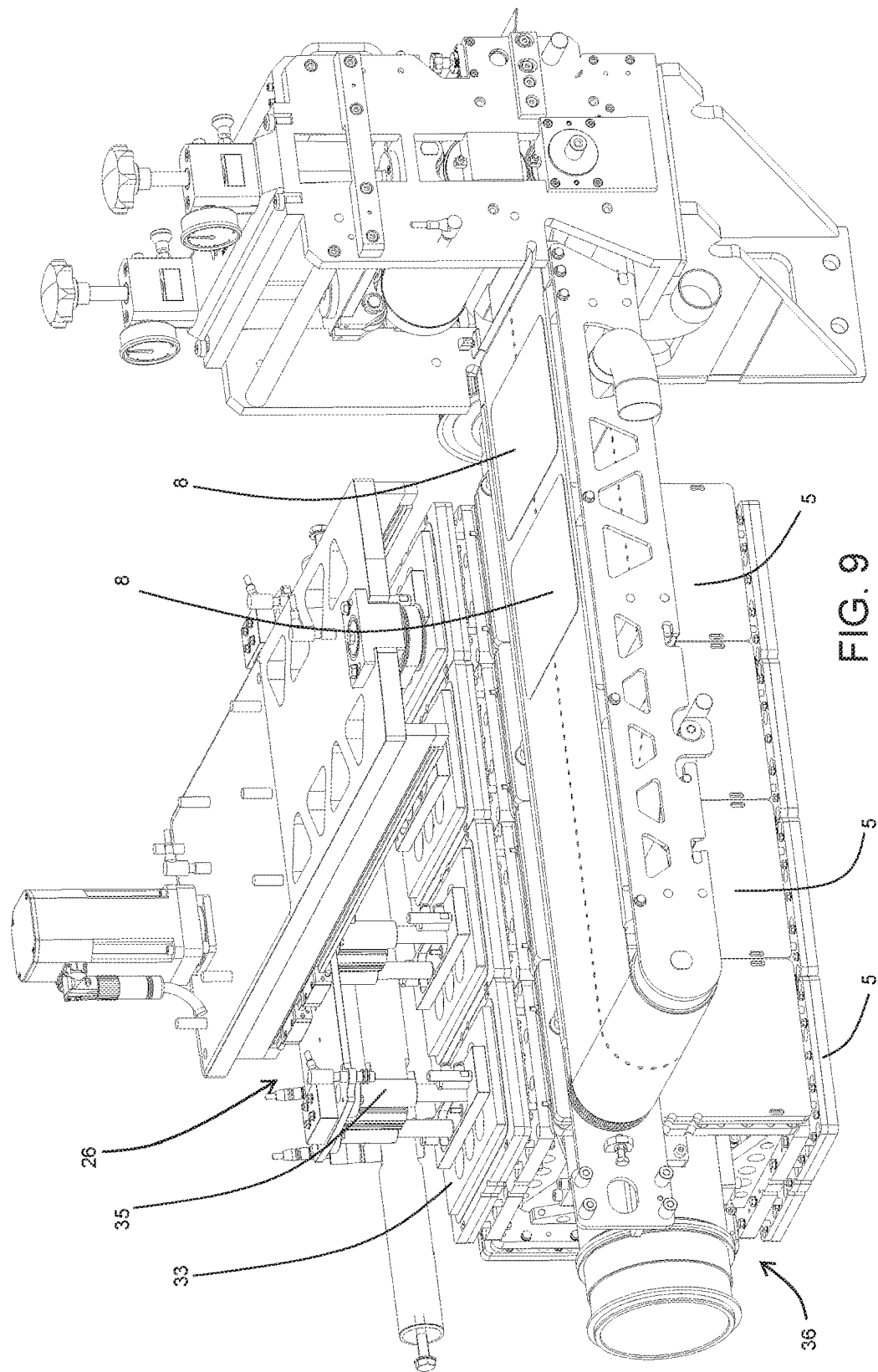

Suitable rotary manifolds 37 of the known type, allow the pneumatic means to be connected to the various closing elements 5, The rotor 36 can rotate at least between a first predetermined angular position in which the closing elements 5 are facing the corresponding shaped moulds 4 (which in the accompanying figures corresponds to the position in which the closing elements 5 face downwards—FIG. 22), and a second predetermined angular position in which the closing elements 5 can receive the flat sheets 8 from the transferring device 26 (which in the accompanying figures corresponds to the position in which the closing elements 5 face upwards—FIG. 9).

Figure 13:
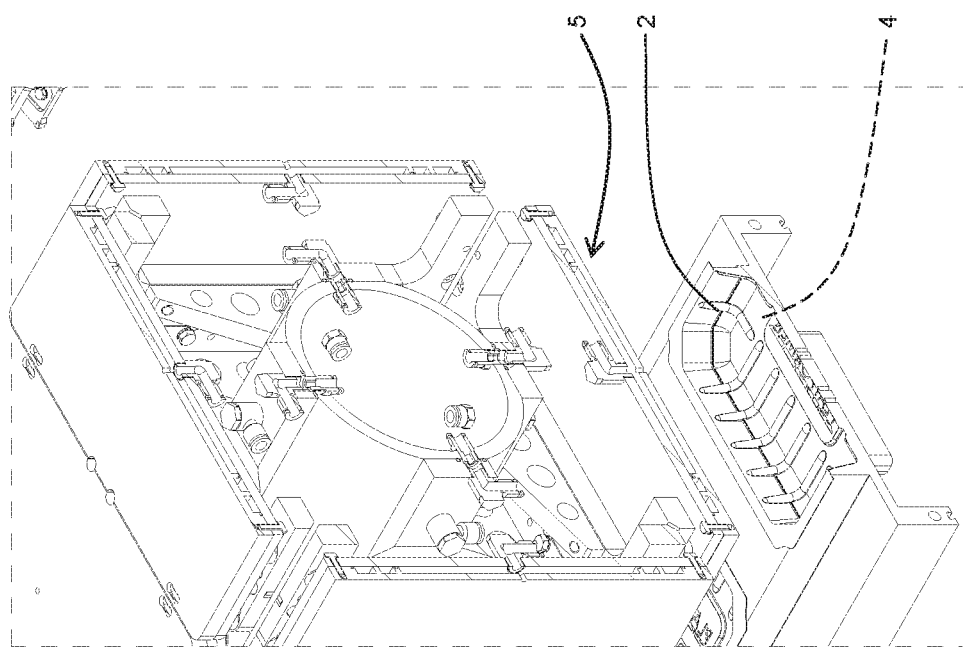
FIG. 13 is an enlarged view of the detail XIII of FIG. 12.

In the embodiments illustrated, the rotor 36 rotates anti-clockwise if observed as in FIG. 13.

Advantageously, as it passes from the first predetermined angular position to the second predetermined angular position, the rotor 36 also adopts a third predetermined angular position (in the embodiment illustrated in this angular position the closing elements 5 face towards the front of the apparatus 1), in which the one or more heating elements 6 heat the closing elements 5 in such a way that the closing elements accumulate enough heat to then be able to sufficiently heat the flat sheet 8 that they will receive in the subsequent second predetermined angular position. It is confirmed that, regarding the first innovative aspect described herein, the heating elements 6 can have any form suitable for the purpose and act on the closing elements 5 at any moment, even if the innovative embodiment described below is particularly advantageous. In particular, the heating elements may be resistors mounted in the rotor 36 and they may heat the respective closing elements 5 continuously (solution not illustrated). The same also applies to the other innovative aspects, except the second one. Furthermore, when passing from the second predetermined angular position to the first predetermined angular position, the rotor 36 advantageously adopts a fourth predetermined angular position in which the closing elements 5 transfer heat to the flat sheets 8 (in the embodiment illustrated, in this angular position the closing elements 5 are facing towards the rear side of the apparatus 1).

Preferably, the rotor 36 remains stationary for a predetermined time every time it is in one of the above-mentioned four predetermined angular positions (advantageously, due to the way in which the rotor 36 is structured—see next paragraph—in the preferred embodiment the dwell time in each predetermined angular position is the same).

Moreover, preferably, the closing elements 5 of the various thermoforming devices 3 3 which are simultaneously movable between the corresponding home and forming positions, are also aligned along a line parallel to the axis of rotation and are advantageously positioned with the resting surfaces 16 lying at least mainly in a plane parallel to the axis of rotation of the rotor 36. Moreover, in the preferred embodiment, to maximise the productivity of the apparatus 1, each thermoforming device 3 comprises a number of closing elements 5 equal to the number of predetermined angular positions of the rotor 36 (therefore, four in the accompanying figures). The closing elements 5 of each thermoforming device 3 are positioned in such a way that when one closing element 5 is in one predetermined angular position, the other closing elements 5 of the same thermoforming device 3 are in the other predetermined angular positions. Therefore, as shown in FIG. 13, in the preferred embodiment the rotor 36 has, at least at the closing elements 5, a substantially square cross-section, in which each side of the square corresponds to one face 38 of the rotor 36 defined by coplanar closing elements 5.

Advantageously, the apparatus 1 also comprises, for each thermoforming device 3, at least one temperature measuring device 39 connected to the electronic unit 10 and positioned in such a way that it measures the temperature of the related closing element 5. The electronic unit 10 is programmed for controlling operation of the heating elements 6 depending on the temperature measured. Depending on requirements, the temperature measuring device 39 may either be mounted in the closing element 5, or it may be of the non-contact measuring type.

The second innovative aspect of the apparatus 1 developed by the Applicant relates to the heating system of the closing element 5 of the thermoforming device 3, and is applied particularly advantageously in all cases in which the closing element 5 (or the closing elements 5 if there are two or more) is mounted on a rotor 36, although it may also be applied in any other embodiment.

According to this innovative aspect, the one or more heating elements 6 of the closing element 5 are, in fact, mounted on a heating body 40 operatively associated with the closing element 5 but independent of it (above all not mounted on the rotor 36 if this is present). In particular, the heating body 40 and the closing element 5 are movable relative to each other between a coupled position and an uncoupled position.

When they are in the coupled position, the heating body 40 is coupled to the resting surface 16 and the heating body 40 can heat the closing element 5 (mainly by contact, that is to say thermal conduction—FIG. 15), In contrast, when they are in the uncoupled position, the heating body 40 is uncoupled from the resting surface 16 and away from it (FIG. 16).

According to a first embodiment, the one or more heating elements 6 can be heated by passing through them electricity (in the preferred embodiment in particular there is a single heating element 6 constituted of an electric resistor—FIG. 21) or a hot fluid (for this purpose, the resistor of FIG. 21 could be substituted with a pipe), whilst the heating body 40 comprises at least one plate made of thermally conductive material and thermally coupled to the one or more heating elements 6 (advantageously the latter are embedded in the plate). In these embodiments, in the coupled position the at least one plate is pressed against the resting surface 16 of the closing element 5 in order to heat it by contact (thermal conduction).

According to a second alternative embodiment not illustrated, the one or more heating elements 6 are, in contrast, constituted of electric inductors, and the closing element 5 is at least partly constituted of a material that can be heated by electromagnetic induction. In particular, that material heatable by electromagnetic induction may either be present in the resting surface 16 (or constitute it), or it may be thermally coupled to it. In this embodiment, in the coupled position the electric inductors are electromagnetically coupled to the material heatable by electromagnetic induction, for heating it by electromagnetic induction.

In both embodiments, operation is controlled by the electronic unit 10, advantageously depending on the readings supplied by at least one non-contact temperature measuring device 39 associated with the thermoforming device 3, connected to the electronic unit 10 and positioned in such a way that it measures the temperature of the closing element 5.

As already indicated, this second innovative aspect is particularly advantageous when the apparatus 1 comprises a rotor 36 on which the closing element 5 is mounted, which can rotate about its own axis of rotation between a first predetermined angular position, in which the closing element 5 is facing the corresponding shaped mould 4, and a second predetermined angular position, in which the closing element 5 can receive the flat sheets 8, and which when passing from the first predetermined angular position to the second angular position also adopts a third predetermined angular position. In fact, advantageously, the closing element 5 and the heating body 40 can adopt the coupled position when the rotor 36 is in the third predetermined angular position. Preferably, in this case, the shifting of the closing element 5 and of the heating body 40 between the coupled position and the uncoupled position occurs by means of a shifting of the heating body 40 (relative to the closing element 5 which remains stationary) along a line perpendicular to a main plane of extension of the closing element 5 which, in the preferred embodiments in which the closing element 5 is mounted on a rotor 36 with horizontal axis of rotation, is parallel to the axis of rotation.

The second innovative aspect can be advantageously applied both in the preferred embodiment of the apparatus 1 in which, when passing from the second predetermined angular position to the first predetermined angular position, the rotor 36 also adopts a fourth predetermined angular position in which, in use, the closing element 5 transfers heat previously received from the heating body 40, to the flat sheet 8 retained on the resting surface 16 (however, at the same time, part of the heat will be dispersed in the surrounding environment), and when the thermoforming device 3 comprises a number of closing elements 5 equal to the number of predetermined angular positions of the rotor 36, as already described previously relative to the first innovative aspect (to which reference should be made for details).

Furthermore, although the second innovative aspect described above is also applicable in the case of apparatuses similar to the prior art ones, that is to say, in which there is a single thermoforming device 3 present, it is also advantageously applied in the case of apparatuses such as that illustrated in the accompanying figures, which comprises a plurality of thermoforming devices 3 that can be operated synchronised with each other for simultaneously thermoforming a corresponding plurality of containers 2. In fact, in this case, the apparatus 1 may simply comprise a heating body 40 combined with one or more heating elements 6, for each thermoforming device 3. Those heating bodies 40 will be simultaneously associable with the related closing elements 5 for heating them.

Figure 3:
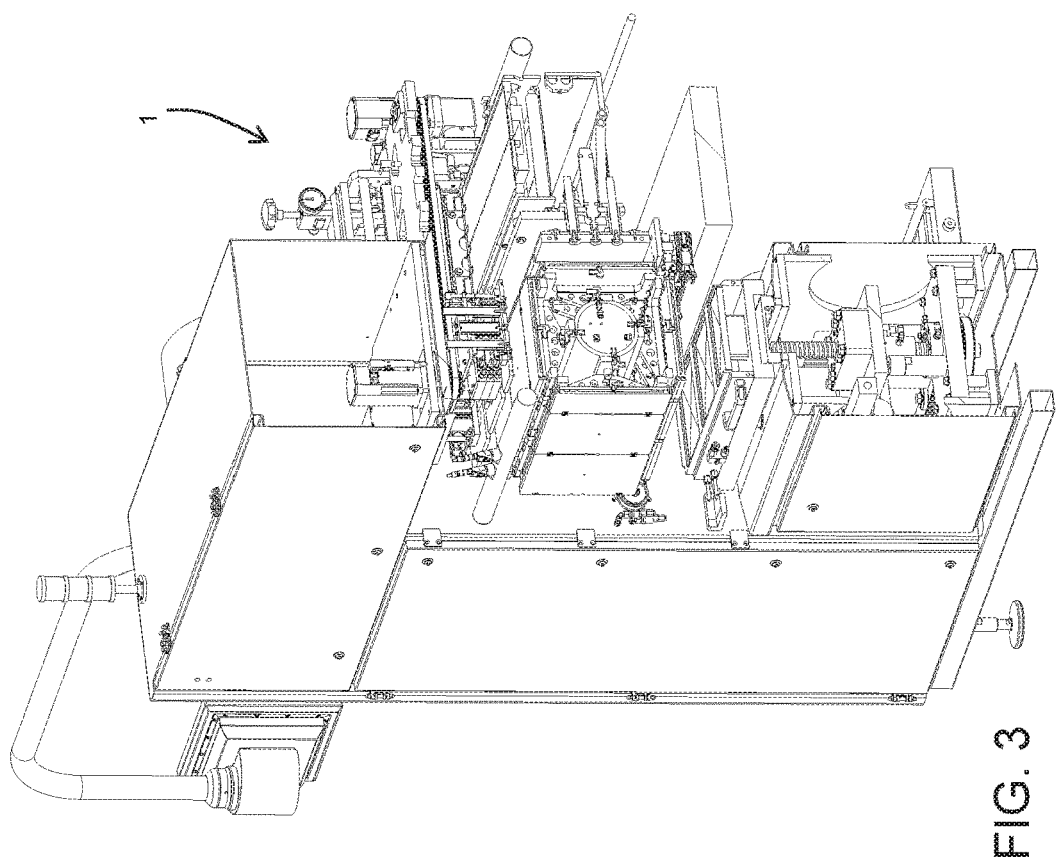
FIG. 3 is an axonometric three-quarter view of the apparatus of FIG. 2 in cross-section according to a vertical cross-section plane.

According to the third innovative aspect developed by the Applicant, a system was developed for allowing use of the same apparatus 1 for making containers 2 using flat sheets 8 having different shapes and/or dimensions, minimising the action to be taken on the apparatus 1 with each size change-over. In particular, according to the third innovative aspect, a single closing element 5 of the thermoforming device 3 was developed, which can be used for making containers 2 starting from two or more flat sheets 8 having different shapes and/or dimensions. However, it shall be understood that the rest of the apparatus described in this patent application may also be used in combination with different technical solutions as regards the closing elements 5 and the action to be taken in the event of a size change-over. Therefore, according to this innovative aspect, the thermoforming device 3 comprises at least one first shaped mould 4 and one second shaped mould 4 which are interchangeable and alternately usable for making containers 2 having different shapes. The first shaped mould 4 comprises a first upper opening 15 having a first extent, whilst the second shaped mould 4 comprises a second upper opening 15 that has a second extent which is different to the first extent. In more complex embodiments, as described in more detail below, the apparatus 1 may comprise any number of interchangeable shaped moulds 4 with upper openings 15 that are different to one another. Advantageously, as shown in the embodiment illustrated in FIGS. 3 and 38 (in which multiple first shaped moulds 4 and multiple second shaped moulds 4 are present, as described in more detail below), the shaped mould 4 (or moulds) is made in one piece with a single supporting element 41 which can be mounted on and demounted from the rest of the apparatus 1 in a similar way to an extractable drawer. In more detail, in embodiments similar to that of FIG. 3 all of the shaped moulds 4 can be made in one piece with a single rigid supporting element 41, and any lack of planarity between the shaped mould 4 and the closing element 5 must be compensated by the mobility of each closing element 5. In contrast, in embodiments similar to that of FIGS. 38 (showing three interchangeable drawers—respectively with two, three and four shaped moulds 4) and 39, all of the shaped moulds 4 (with one or more impressions) are mounted on a single support 41 with interposed supporting springs 72 for allowing the shaped mould 4 to move towards the support 41 following the pressure applied, in use, by the closing element 5 (which advantageously in this case is rigid) for allowing compensation for any lack of planarity.

In contrast, as regards the closing element 5, according to this third innovative aspect, the suction holes 17 made in it are grouped in at least one first group 42 and one second group 43 (or, in general, as described in more detail below, in a number of groups equal to the number of interchangeable shaped moulds 4 with different upper openings 15).

The suction holes 17 of the first group 42 are in fluid communication with a respective first suction duct 44, whilst the suction holes 17 of the second group 43 are in fluid communication with a respective second suction duct 45 independent of the first suction duct 44. At least the second suction duct 45 is equipped with selective closing means (not illustrated but advantageously constituted of a valve, even of the manual type, that closes the second suction duct 45), that can be operated for disabling the suction through the suction holes 17 of the second group 43.

Furthermore, the suction inlets 18 of the suction holes of the various groups are distributed on the resting surface 16 in such a way that on the resting surface 16 it is possible to identify one or more first areas 46 that each contain exclusively a plurality of suction inlets 18 of suction holes 17 belonging to the first group 42, and one or more second areas 47, separate from the one or more first areas 46, which each contain exclusively a plurality of suction inlets 18 of suction holes 17 belonging to the second group 43.

Furthermore, when the first shaped mould 4 is used, in the forming position the first upper opening 15 is completely facing only the one or more first areas 46 (in this case the first upper opening 15 has a shape and size that substantially match the overall shape and size of the one or more first areas 46), whilst, when the second shaped mould 4 is used, in the forming position the second upper opening 15 is completely facing either only the one or more second areas 47 (in this case the second upper opening 15 has a shape and size that substantially match the overall size and shape of the one or more second areas 47) or both the one or more first areas 46 and the one or more second areas 47 (in this case the second upper opening 15 has a shape and size that substantially match the overall shape and size of the sum of the one or more first areas 46 and of the one or more second areas 47). Acting on the selective closing means, it is therefore possible to activate suction either through only the suction holes 17 of the first group 42, or through only the suction holes 17 of the second group 43 (however, in this case the first duct must also be equipped with selective closing means), or through both together, depending which of those holes have suction inlets 18 in fluid communication with the inside of the shaped mould 4.

However, in the preferred embodiments, the suction inlets 18 are distributed on the resting surface 16 in such a way that on the resting surface 16 itself only a single first area 46 and a single second area 47 are identifiable. Even more preferably, the second area 47 has an annular shape and surrounds the first area 46, and the first area 46 is in contact with the second area 47 along its entire external perimeter. That situation is clearly shown in FIG. 20, where the first area 46 is the central area covered by the flat sheet 8, whilst the second area 47 is the area surrounding it. In this way, it is possible to use a single closing element 5 for flat sheets 8 of two different sizes, one larger (FIG. 19) and one smaller (FIG. 20), always centring the flat sheets 8 on the closing element 5.

In other embodiments, in which there are multiple first areas 46 and multiple second areas 47 present, it may also advantageously be the case that each of the one or more first areas 46 is in contact with one or more of the one or more of the one or more second areas 47 and vice versa.

As regards the suction ducts, as illustrated in FIG. 18, each of them advantageously comprises a manifold chamber 48 extending inside the closing element 5 (in particular in the operating structure 20 in the embodiment illustrated) and which at least mainly matches the extent of the area containing the related suction inlets 18. FIG. 18 also illustrates how inside the manifold chamber 48 there may be stiffening ribs 49 present for supporting the resting surface 16 in the best possible way.

As already indicated, the third innovative aspect is also to be used for apparatuses in which the thermoforming device 3 generically comprises N interchangeable shaped moulds 4 alternately usable for making containers 2 having different shapes, with N≥3, and in which, for each 1≤n≤N, the nth shaped mould 4 has an nth upper opening 15 with an nth extent which is different to that of all of the other shaped moulds 4.

In this case, the suction holes 17 of the closing element 5 are grouped in at least N groups, and, for each 1≤n≤N, the suction holes 17 of the nth group are in fluid communication with the respective nth suction duct equipped with respective selective closing means that can be operated for disabling the suction through the suction holes 17 of the self-same nth group (only one of those ducts, for the sake of simplicity defined as the first duct, may if necessary not be equipped with selective closing means). Moreover, on the resting surface 16, for each 1≤n≤N, it will be possible to identify one or more nth areas that each contain exclusively a plurality of suction inlets 18 of suction holes 17 belonging to the nth group and which are separate from the areas that contain the suction inlets 18 of the suctions holes 17 belonging to the other groups, When the nth shaped mould 4 is used, and when that nth shaped mould 4 and the closing element 5 are in the forming position, the nth upper opening 15 may be completely facing either only the nth areas or both the nth areas and other areas (one or more), similarly to what is described above for the simpler case in which N=2. Moreover, in some preferred embodiments, when the nth shaped mould 4 and the closing element 5 are in the forming position, the nth upper opening 15 is completely facing all of the one or more kth areas, where 1≤k≤n−1 (this means, for example, that the fourth upper opening 15 of the fourth shaped mould 4, is completely facing all of the first, second and third areas). In other words, the one or more first areas 46 have the minimum surface area and the subsequent ones have a gradually ever increasing surface area that comprises all of the surface areas of the preceding areas (subsequent and preceding with reference to the related numbering). Furthermore, in a generalisation of the embodiment illustrated, on the resting surface 16 a single mth area can be identified for each 1≤m≤N, with each of those one or more nth areas, except the first area 46, having an annular shape and being positioned concentric with and outside the preceding areas. That idea may be formulated as follows: each mth area, with 2≤m≤N, has an annular shape, surrounds the (m−1)th area, and is in contact with an entire external perimeter of the (m−1)th area. In contrast, the first area 46 corresponds to the not-necessarily annular area delimited by the second annular area 47.

The closing elements 5 described above are advantageously applied both in the specific embodiment illustrated in the accompanying figures, and in combination with one or more of the other innovative aspects.

In particular, they are validly applied in an apparatus 1 in which the feeding means 7 for feeding flat sheets 8 to the closing element 5 comprise, as described above, a pickup station 24, a feeder 25 for feeding flat sheets 8 of thermoformable plastic material to the pickup station 24, and a transferring device 26 for transferring the flat sheets 8 from the pickup station 24 to the closing element 5, the transferring device comprising at least one pierced suction plate, movable between a pickup position in which it is facing the pickup station 24, and a releasing position in which it is facing the closing element 5.

Furthermore, they are also advantageously applied in apparatuses that comprise a plurality of thermoforming devices 3 which can be operated in a synchronised way for simultaneously thermoforming a corresponding plurality of containers 2, in which each device has the same number of shaped moulds 4 and in which the closing elements 5 of each thermoforming device 3 have similar resting surfaces 16 and similar suction holes 17.

The fourth innovative aspect developed by the Applicant relates to the feeder 25 for feeding flat sheets 8 of thermoformable plastic material to the pickup station 24, whether this is able to house one flat sheet 8 at a time or a plurality.

According to this innovative aspect, the feeder 25 comprises at least one support 50 for a reel 51 of a web 52 of thermoformable plastic material, unwinding means 53 for unwinding the reel 51 of web 52 designed to, in use, feed the web 52 along a sliding path extending from the at least one support 50 to the pickup station 24, and a cutting device 54 for cutting the web 52 that is positioned along the sliding path and is designed to divide the web 52 into a plurality of pieces, each of which corresponds to one flat sheet 8 to be fed to the pickup station 24. In the embodiment illustrated, there are two supports 50 for reels 51, so that when one reel finishes, production can immediately continue using the other reel, meaning that the finished reel does not have to be instantly replaced.

In particular, in accordance with several preferred embodiments, the cutting device 54 is designed to make on the web 52 only cuts transversal to a line of extension of the sliding path, in order to allow use of the entire width of the web 52 for making the flat sheets 8. In fact, those transversal cuts, in use, divide the web 52 into a plurality of pieces each of which has, transversally to the line of extension of the sliding path, a width that is equal to the width of the web 52.

Figure 33:
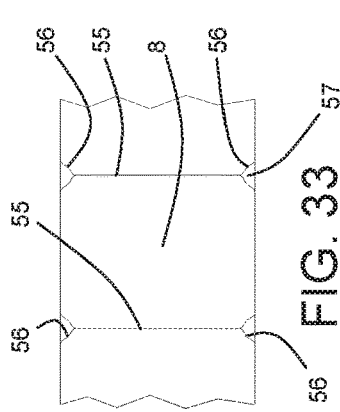
FIGS. 33 and 34 show two alternative web cutting profiles for making flat sheets.
Figure 34:
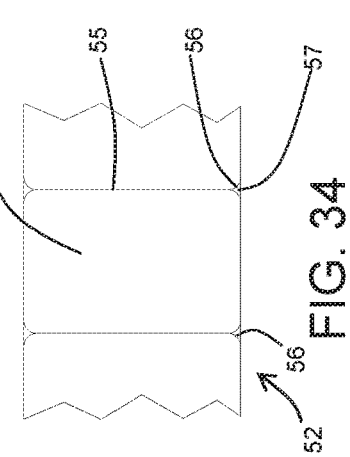
Figure 35:
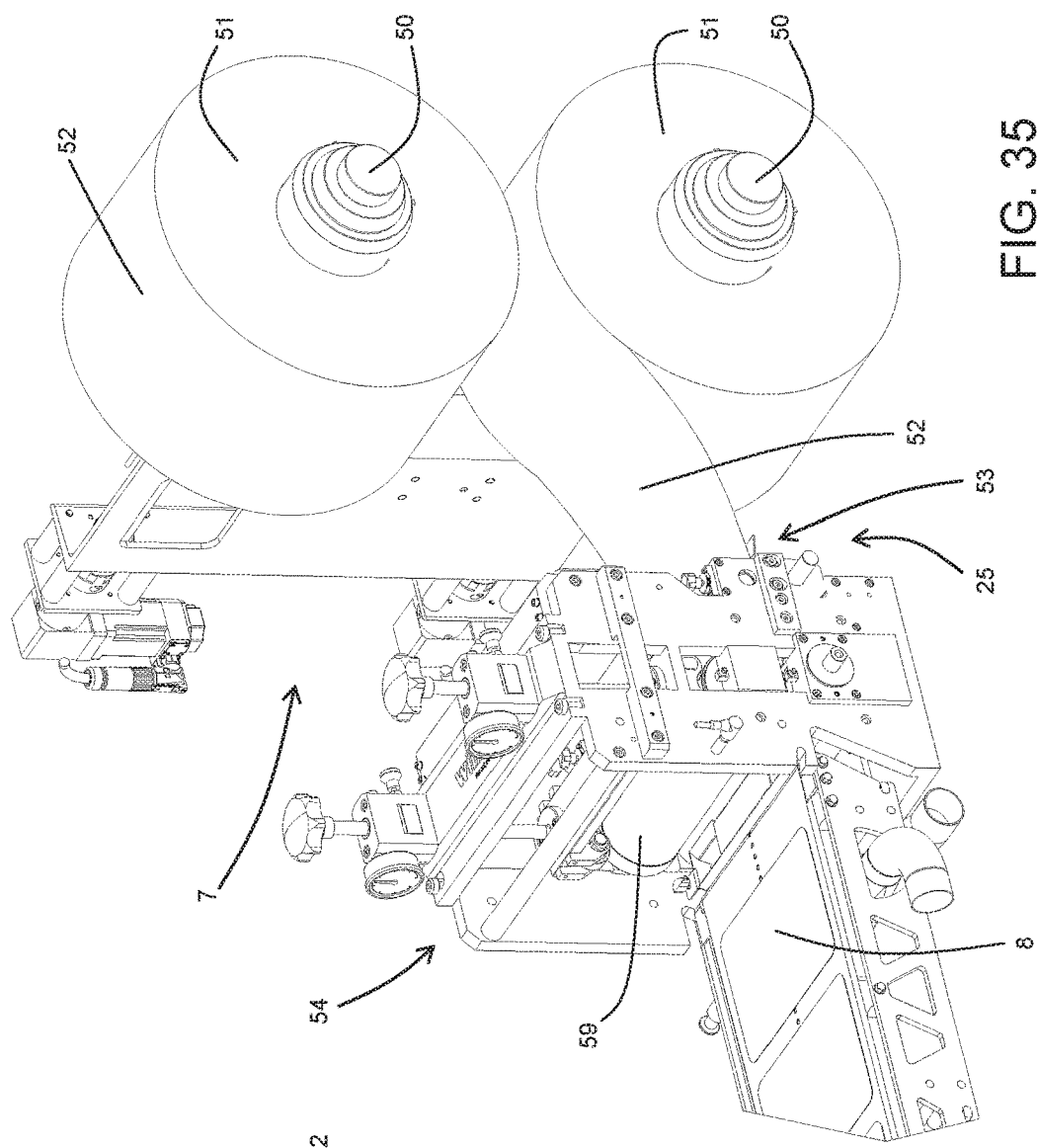
FIG. 35 is an axonometric view, with some parts cut away, of a detail of the apparatus of FIG. 1 relating to preparation of the flat sheets.

Although in some embodiments the cutting device 54 may only make the transversal cuts, in order to prevent the flat sheets 8 and, consequently, the thermoformed containers 2 from having sharp corners, in the preferred embodiments the cutting device 54 is designed to make on the web 52 both a main cut 55 that is perpendicular to the line of extension of the sliding path, and that extends inside the web 52 and along most of the width of the web 52, and, at each end of the main cut 55, a pair of secondary cuts 56 that extend diverging from the related end of the main cut 55 to the edge of the web 52 (FIGS. 33 and 34). In that way, only the part of web 52 located between each pair of secondary cuts 56, roughly having a triangular shape with sides that may or may not be straight, constitutes the scrap 57 produced by the cutting device 54. In the known way, the scrap 57 is collected and removed by a suction device 58 therefore not described in detail.

In further embodiments, not illustrated, it is possible that the feeder 25 is structured in such a way that it simultaneously feeds a plurality of flat sheets 8 arranged side by side. In this case, advantageously, the web 52 has a width equal to the sum of the widths of all of the flat sheets 8 to be fed simultaneously, and the cutting device 54 is designed to make on the web 52 exclusively one or more longitudinal cuts, parallel to a line of extension of the sliding path, for dividing the web 52 into a plurality of strips side by side, and on each strip obtained in that way, cuts transversal to the line of extension of the sliding path which are the same as those described above for a web 52 with a width equal to the width of a single flat sheet 8 (in fact, each strip may be seen as an independent web 52).

Figure 37:
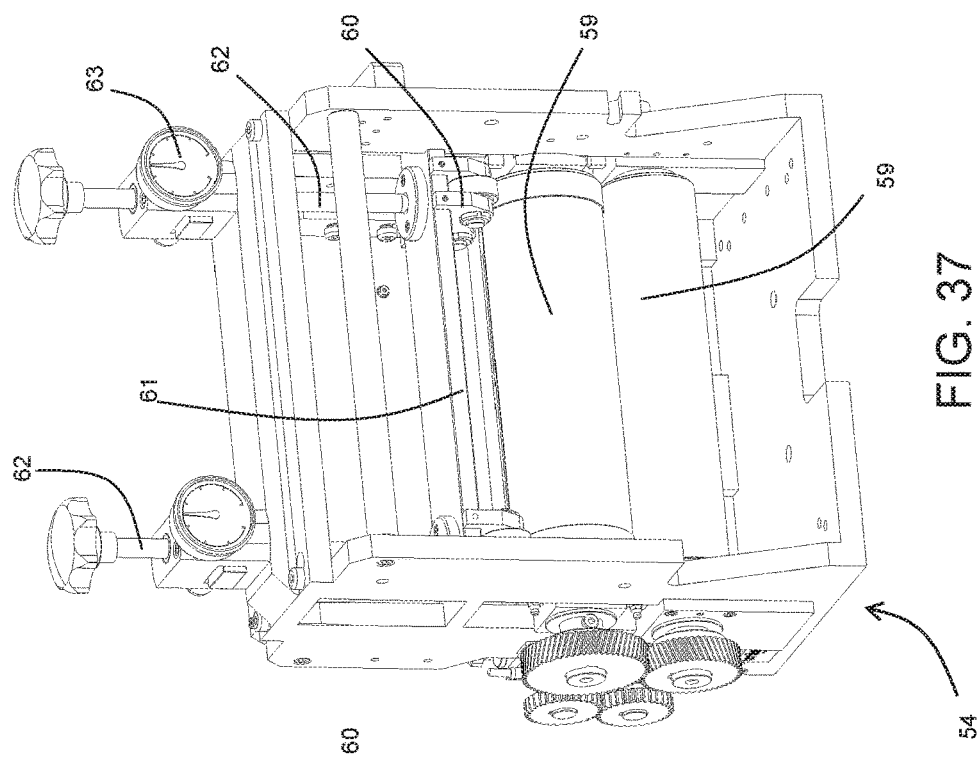
FIG. 37 is an axonometric view, from a different viewpoint, only of the central part of what is visible in FIG. 35.

As shown in FIG. 37, in the embodiment illustrated the cutting device 54 comprises at least one pair of motor-driven counter-rotating rollers 59 between which, in use, the web 52 can slide. At least one of said counter-rotating rollers 59 is equipped with one or more blades (not illustrated) which are designed to make the above-mentioned transversal and, if necessary, longitudinal cuts.

Moreover, in the preferred embodiments, the pair of counter-rotating rollers 59 is also part of the unwinding means 53 and causes controlled feeding of the web 52/of the flat sheets 8 for the entire time that elapses between two successive cuts. For that purpose too, in the preferred embodiment the pressure applied on the web 52 that passes between the two counter-rotating rollers 59, may be adjusted by means of two small roller-type thrust elements 60, that act on the ends of one of the two counter-rotating rollers 59 (the upper one in FIG. 37) and that are mounted on a crosspiece 61 in turn pushed towards the other roller by two threaded bars 62 equipped with a torque reader 63.

Figure 40:
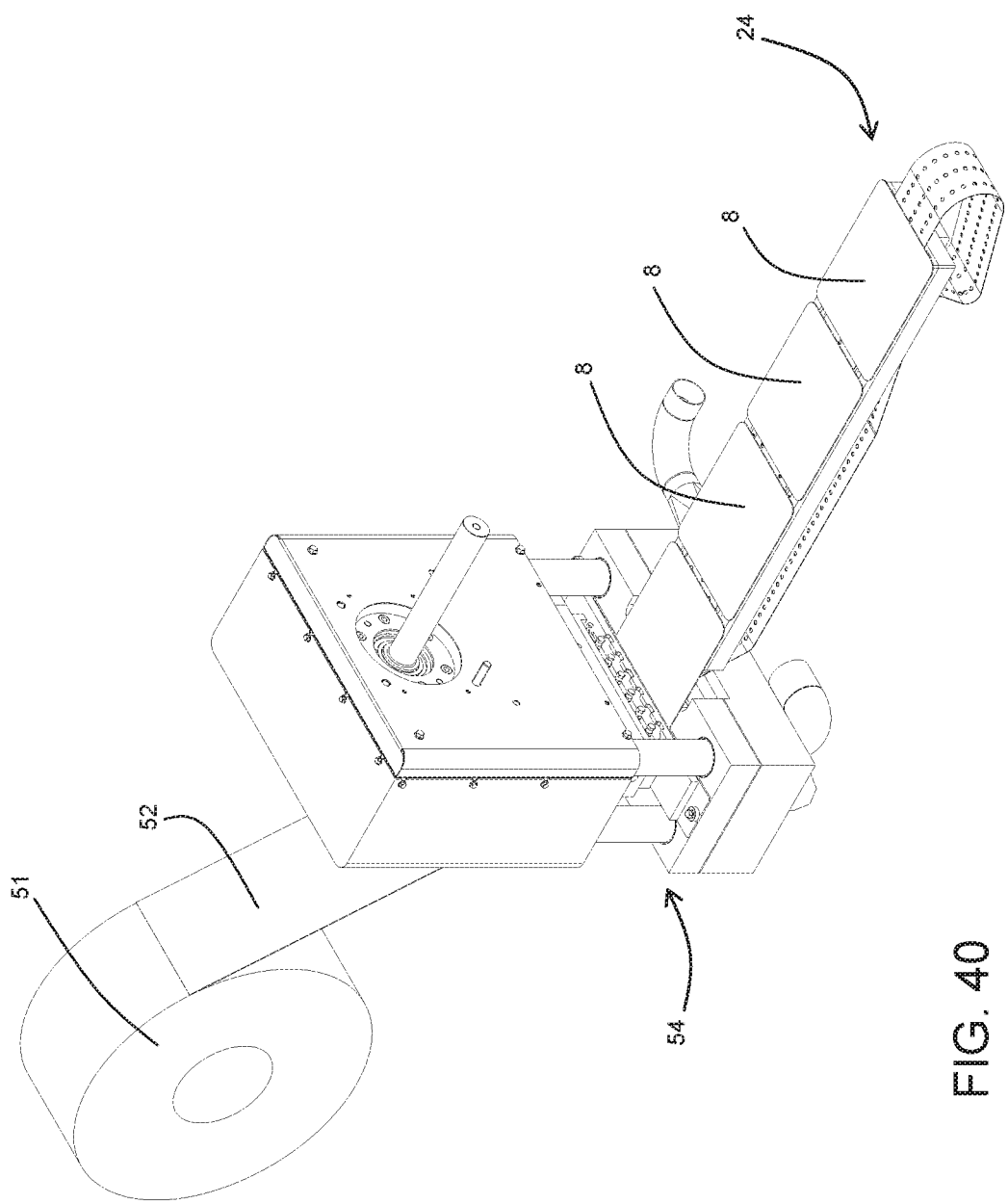
FIG. 40 is an axonometric view of an alternative embodiment of a feeder of flat sheets of thermoformable plastic material of the machine of FIG. 1.
Figure 41:
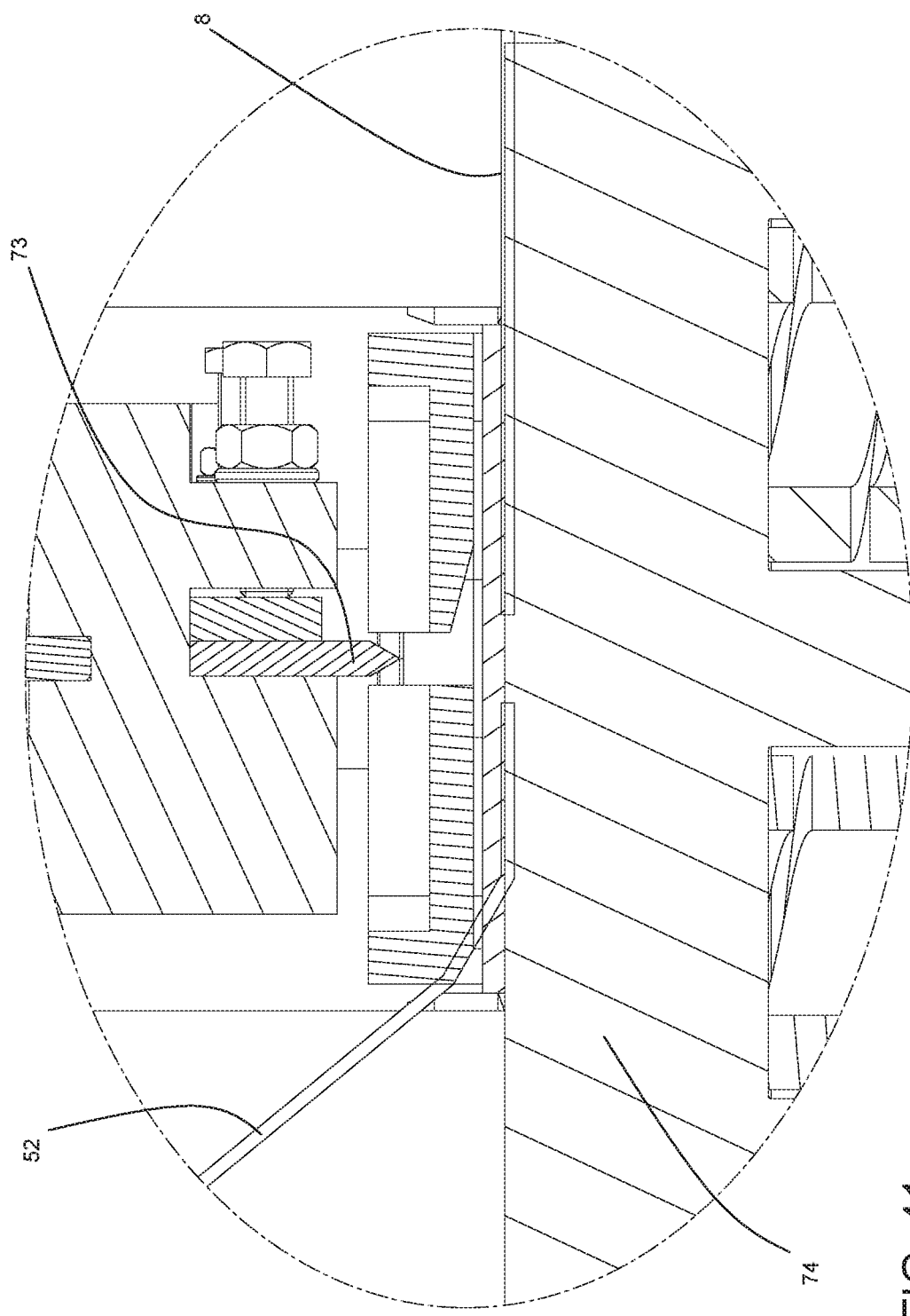
FIG. 41 is a vertical axial section of a detail of a blade of the feeder of FIG. 40 in a first position.
Figure 42:
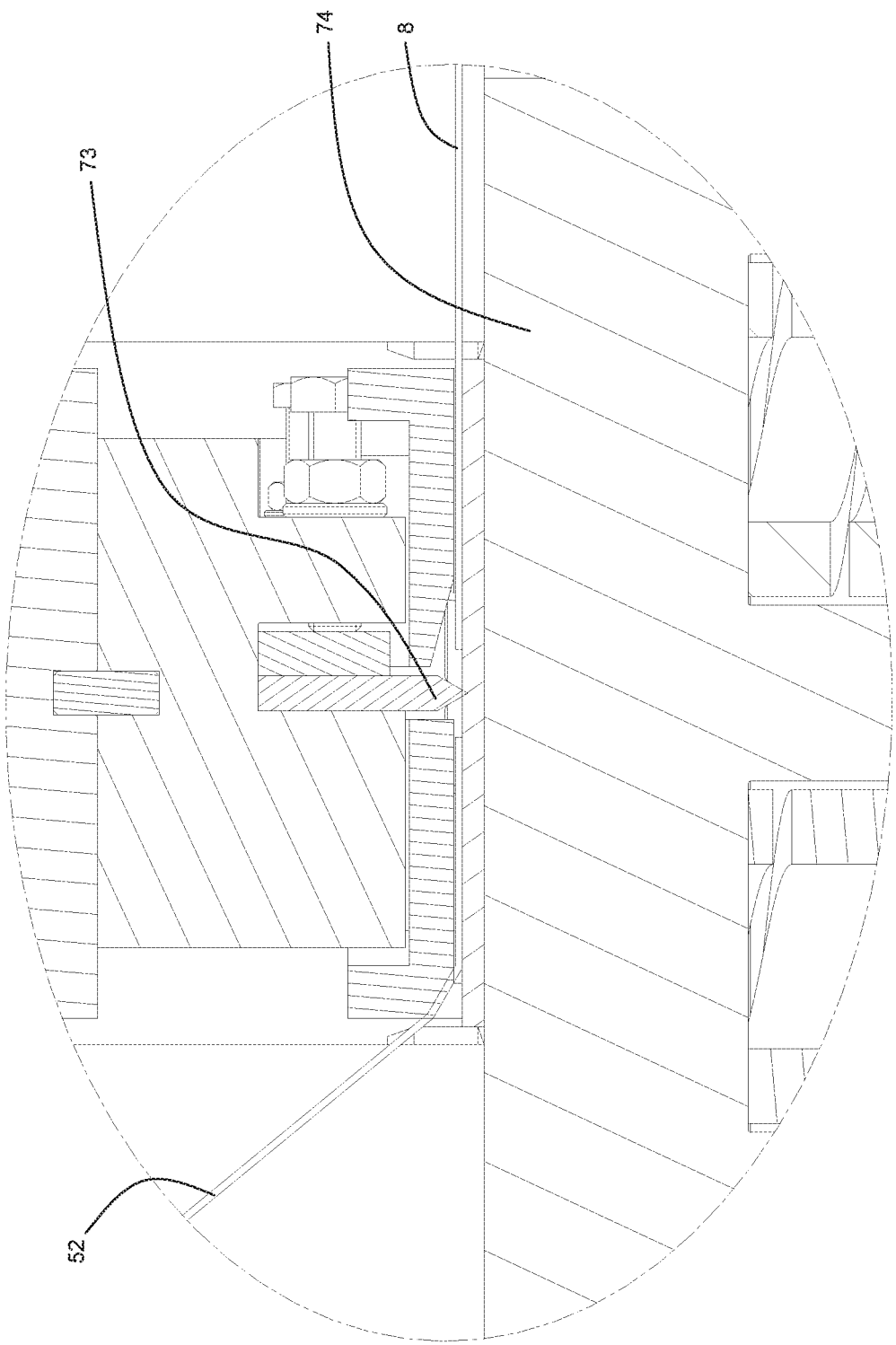
FIG. 42 shows the blade of FIG. 41 in a second position.

Alternatively, in the embodiment of FIGS. 40 to 42 the cutting device 54 comprises at least one transversal blade 73 movable relative to a contact element 74 transversally to the sliding path (vertically in the figures), between a first position in which the two are away from each other and allow feeding of the web 52 along the sliding path (FIG. 41) and a second position in which they are clamped against each other for, in use, cutting the web 52 (FIG. 42).

Figure 36:
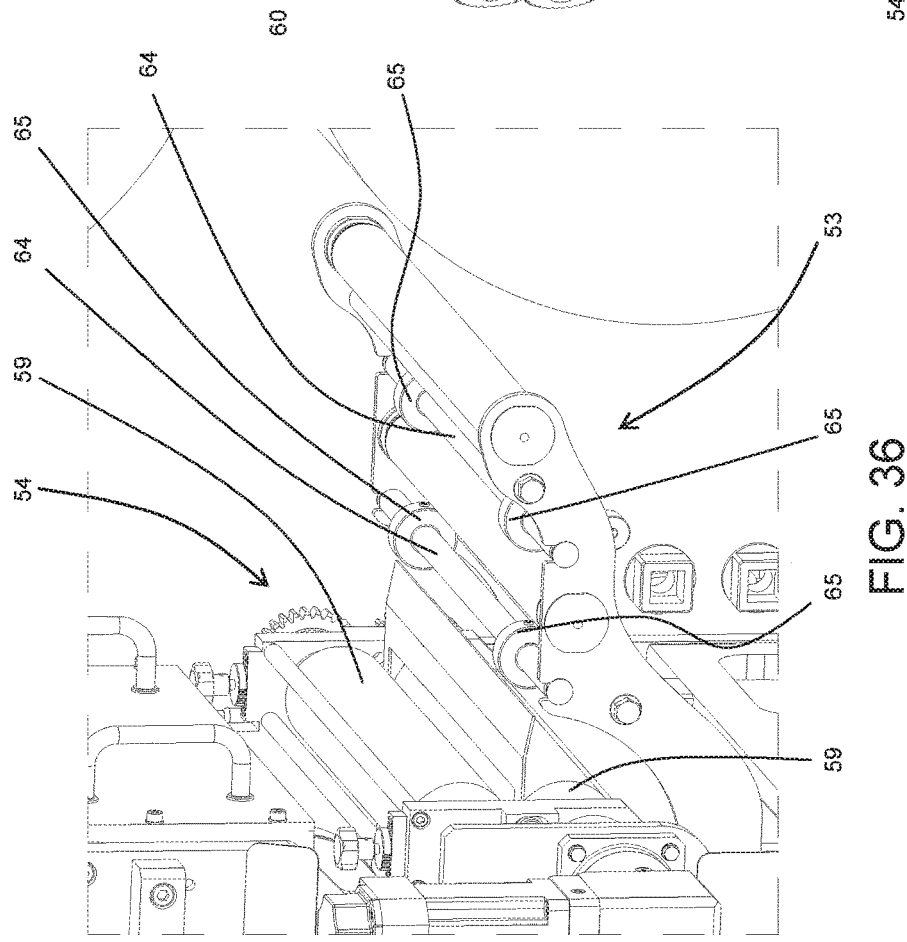
FIG. 36 is an enlarged view of the detail XXXVI of FIG. 1.

Between the at least one support 50 for the reel 51 of web 52 and the cutting device 54 there are also advantageously web 52 centring elements, which in FIG. 36 are constituted of two removable bars 64 on which two lateral containment disks 65 are fixed, said disks being separated by a distance substantially equal to the width of the web 52.

If this fourth innovative aspect has to be combined with an apparatus 1 able to make containers 2 having different shapes and/or sizes, using flat sheets 8 having different shapes and/or sizes (such as those of FIGS. 33 and 34), and in which the thermoforming device 3 comprises at least one first shaped mould 4 and one second shaped mould 4 which are interchangeable and alternately usable for making containers 2 having different shapes, advantageously, the cutting device 54 comprises at least one first cutting unit and one second cutting unit, which are also interchangeable and alternately usable. The first cutting unit will be designed for dividing the web 52 into a plurality of flat sheets 8 of a first type (to be used with the first shaped mould 4), whilst the second cutting unit will be designed for dividing the web 52 into a plurality of flat sheets 8 of a second type (to be used with the second shaped mould 4).

Depending on the embodiments, it may be the case that both the first and second interchangeable cutting units are constituted of one or both of the counter-rotating rollers 59, of the transversal blade 73 alone or combined with the contact element 74, or that they are constituted of the entire cutting device 54 (such as that illustrated in FIG. 37).

If they are present, and if necessary, the centring elements may also be substituted.

Finally, it should be noticed that in some embodiments not illustrated the apparatus 1 may also comprise a magazine for flat sheets 8 that have already been cut and corresponding means for sending the flat sheets 8 to the pickup station 24 to be used in place of the reel 51 of web 52, In fact, the presence of the magazine may be useful if flat sheets 8 having a special shape have to be used, which are not easy to obtain from a web 52 with reduced scrap 57 (for example, circular flat sheets 8).

The final (fifth) innovative aspect of the apparatus 1 developed by the Applicant, relates to the system for extracting the thermoformed containers 2 from the shaped mould 4 and their transfer onto the conveying device 69 intended to feed them towards the subsequent apparatuses of the plant. According to this innovative aspect, first, when the shaped mould 4 and the closing element 5 are in the forming position, they adopt a configuration such that the thermoforming device 3, in use, can perform thermoforming of the flat sheet 8 that allows the production of a container 2 equipped with an upper flange 71 projecting outward. In the preferred embodiment that flange 71 is obtained thanks to the fact that the resting surface 16 is flat and the fact that the shaped mould 4 clamps an outer frame of the flat sheet 8 between its own perimetric edge 15 and the resting surface 16.

Second, at least one edge 66 of the flange 71 of the container 2 made in that way projects relative to the shaped mould 4, at least when the shaped mould 4 and the closing element 5 are positioned relative to each other in an extracting position. Depending on requirements, the extracting position may correspond to any position between the forming position (included) and the home position (included). However, in the preferred embodiment, as described below, it corresponds to an intermediate position between the forming position and the home position and which is separated from the home position by a distance greater than the maximum depth of the shaped mould 4.

According to the embodiment referred to in FIGS. 22 to 32, the shaped mould 4 is made in such a way that at least after thermoforming, the at least one edge 66 of the flange 71 of the container 2 projects relative to the shaped mould 4, at least when the shaped mould 4 and the closing element 5 are positioned relative to each other in an extracting position.

In particular, in a first embodiment the edge 66 of the flange 71 that projects may be obtained thanks to the fact that the resting surface 16, or rather the part of it where the flat sheet 8 is retained before thermoforming, is sized in such a way that, in the forming position, it at least locally extends beyond the dimensions of the shaped mould 4 (FIG. 23). In this way, in use, at least one perimetric portion 67 of the flat sheet 8 projects relative the shaped mould 4 both during thermoforming of the container 2, and after the thermoforming, when that perimetric portion 67 forms the projecting edge 66 of the flange 71 of the container 2.

In contrast, in an alternative embodiment not illustrated, the shaped mould 4 may comprise at least one movable portion, that is movable between a facing position that it adopts at least in the forming position and in which it faces the above-mentioned edge 66 of the flange 71 for clamping it against the resting surface 16, and an away position that it adopts at least in the extracting position and in which it is positioned away from the edge 66 of the flange 71 in order to allow access to it.

Figure 43:
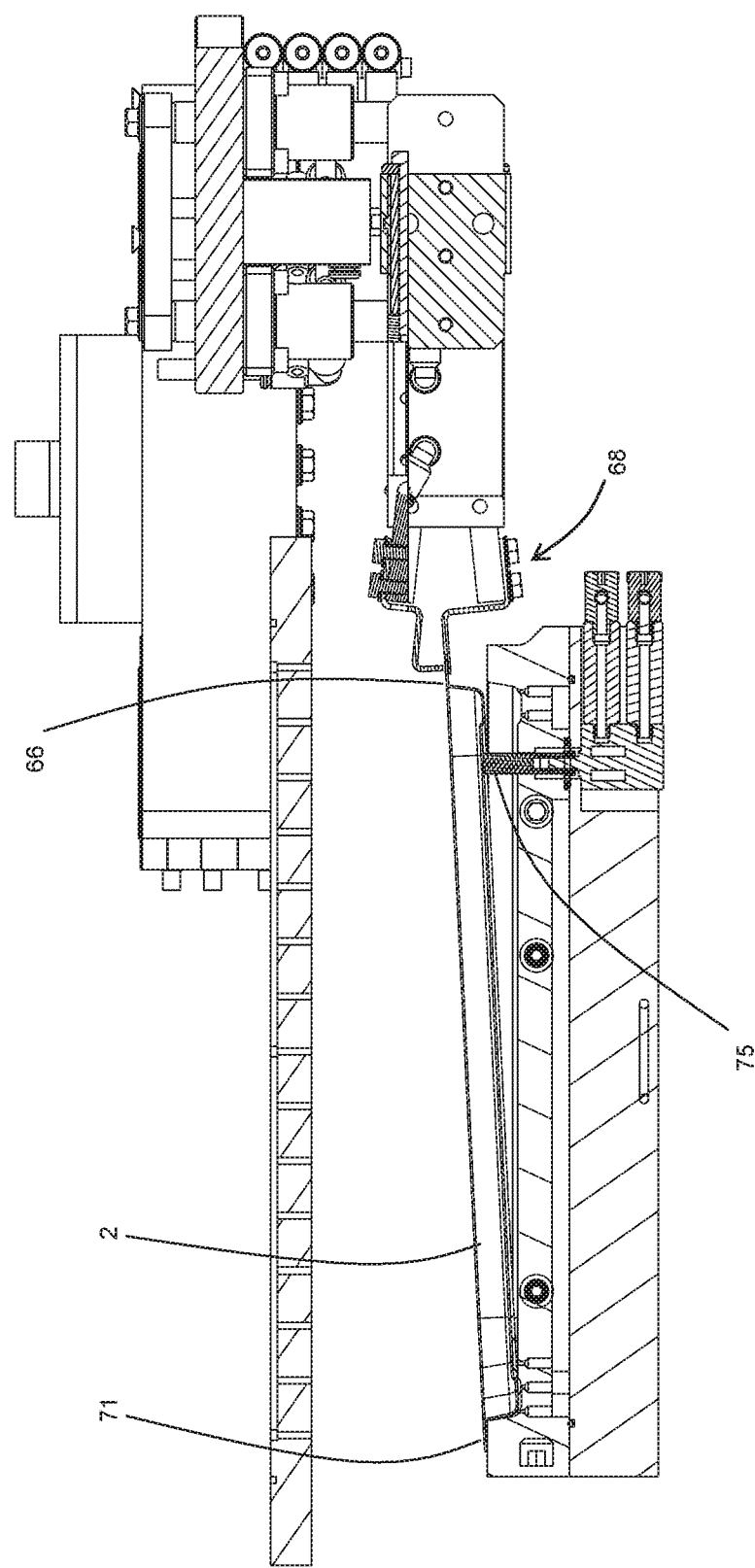
FIG. 43 shows an alternative embodiment of a shaped mould of the machine of FIG. 1, during a step of a process for extracting a thermoformed container.

According to a second embodiment illustrated in FIG. 43, the shaped mould 4 also comprises an extraction unit 75 switchable between a retracted in position in which it allows a thermoformed container 2 to remain in the shaped mould 4, and a protruding out position in which it keeps outside the shaped mould 4 at least one part of the thermoformed container 2 that comprises the at least one edge 66 of the flange 71. That extraction unit 75 is positioned in the protruding out position at least when the shaped mould 4 and the closing element 5 are in the extracting position for allowing a gripper element 68 described below to grip said at least one edge 66.

Also according to the fifth innovative aspect which is the subject matter of this description, the extracting device 9 comprises at least one gripper element 68 that is shiftable between a pickup position and a releasing position, as well as being switchable between a pickup configuration (in which the gripper is closed) and a releasing configuration (in which the gripper is open). When it is in the pickup position, by switching from the releasing configuration to the pickup configuration, the gripper element 68 is able to grip the above-mentioned projecting edge 66 of the flange 71, thereby retaining the container 2. In contrast, when it is in the releasing position, by switching from the pickup configuration to the releasing configuration, the gripper element 68 is able to release the above-mentioned projecting edge 66 of the flange 71 and consequently to release the container 2 onto the conveying device 69.

Therefore, when the shaped mould 4 and the closing element 5 are in the extracting position, and the gripper element 68 is in the pickup position, the gripper element 68 is near to the shaped mould 4 at a zone in which, in use, the edge 66 of the flange 71 is located and can grip said edge 66 for retaining the container 2, In contrast, when the gripper element 68 is in the releasing position, it is away from the shaped mould 4.

According to the first embodiment described above, starting from the position in which the shaped mould 4 and the closing element 5 are in the extracting position, and the gripper element 68 is in the pickup position and has gripped the edge 66 of the container 2, the gripper element 68 and the shaped mould 4 are also movable relative to each other along an extracting line for causing the container 2 to come out of the shaped mould 4 (extraction) while the container is retained by the gripper element 68. For that purpose, the extracting line is transversal to a lying plane defined, in use, by the projecting flange 71 of the container 2.

That movement of the shaped mould 4 and of the gripper element 68 relative to each other may be obtained in various ways according to requirements.

According to the preferred embodiment, in which the shifting of the shaped mould 4 and of the closing element 5 from the forming position towards the home position occurs by means of a movement of the shaped mould 4 away from the closing element 5, and in which the extracting position corresponds to the above-mentioned intermediate position between the forming position and the home position, advantageously the movement of the shaped mould 4 and of the gripper element 68 relative to each other is obtained simply by the shaped mould 4 passing from the intermediate position to the home position.

Despite that, in other embodiments not illustrated, the movement of the shaped mould 4 and the gripper element 68 relative to each other may be obtained by a shifting of the gripper element 68 relative to the shaped mould 4 (for example, when the extracting position coincides with the home position).

However, in both of these cases, preferably the gripper element 68 and the shaped mould 4 are movable relative to each other along an extracting line perpendicular to the lying plane defined, in use, by the projecting flange 71 of the container 2.

In the case of the second embodiment described above, in which, when the shaped mould 4 and the closing element 5 are in the extracting position, the extraction unit 75 is in the protruding out position, as shown in FIG. 43 container 2 extraction from the shaped mould 4 may occur either using the same methods as for the first embodiment or by means of a simple movement of the gripper element 68 from the pickup position towards the releasing position.

Figure 25:
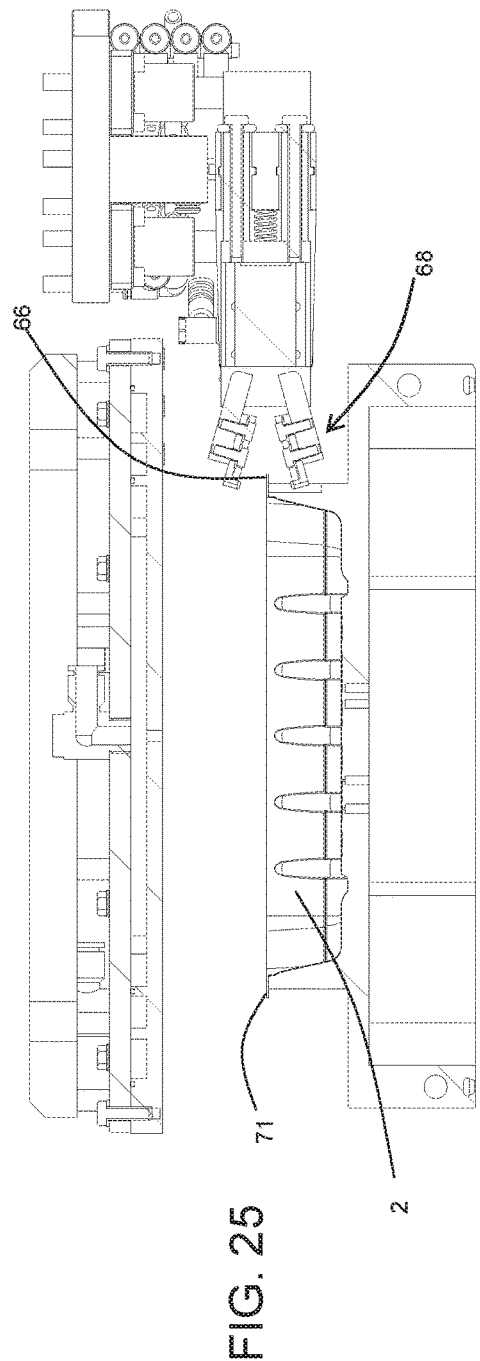
Figure 26:
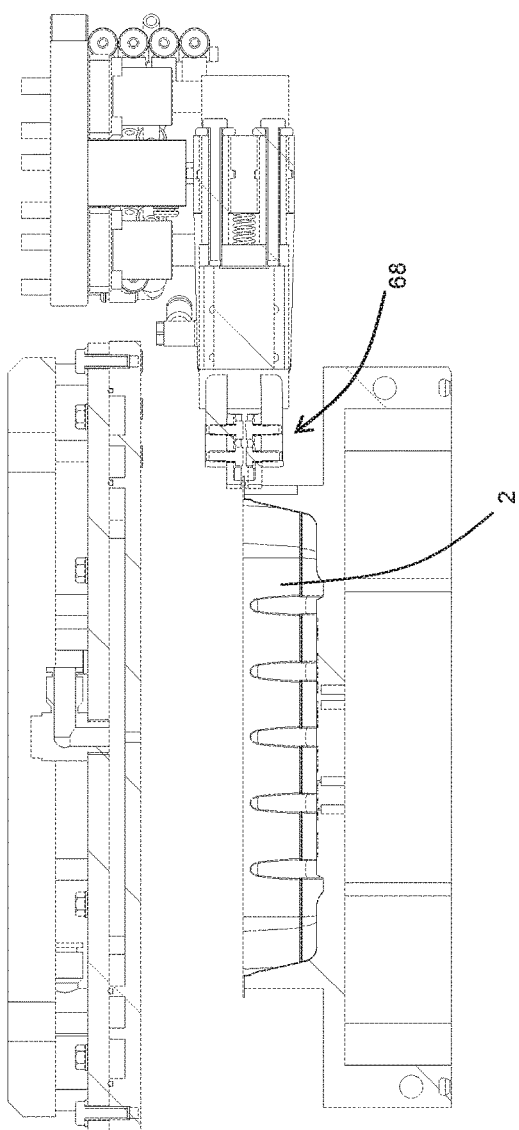

The entire container 2 forming and extraction sequence is fully illustrated in FIGS. 22 to 32 as regards the first embodiment. The steps illustrated in FIGS. 22 to 24 and 27 to 32 are substantially also valid for the second embodiment, whilst for the latter the steps in FIGS. 25 and 26 are substituted by the step of FIG. 43.

Figure 27:
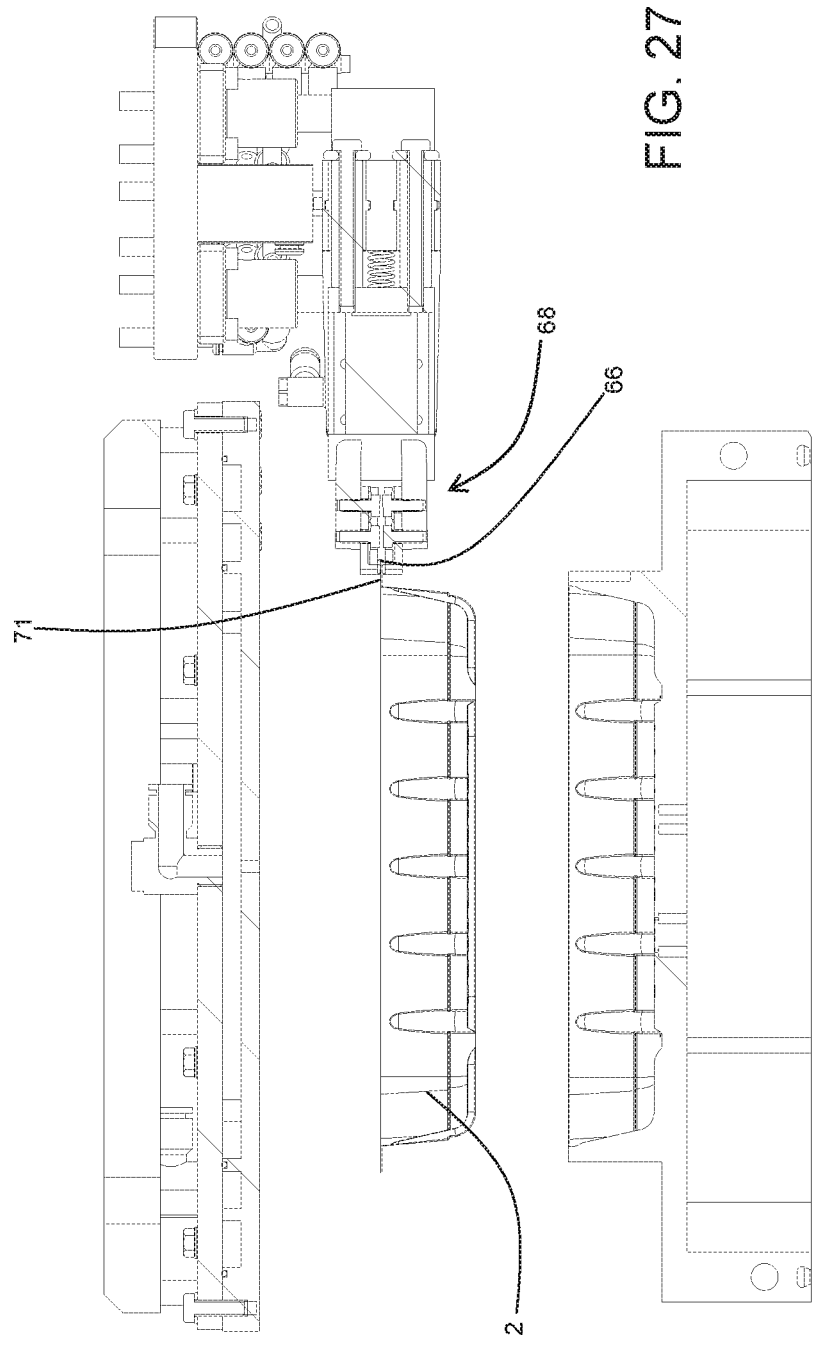

Starting from a situation in which a flat sheet 8 is retained by the closing element 5, with the shaped mould 4 in the home position (FIG. 22), first the shaped mould 4 and the closing element 5 are brought into the forming position and clamp the flat sheet 8 between them. However, in the case of the first embodiment a perimetric portion 67 of the flat sheet 8 remains outside the shaped mould 4 (FIG. 23). Once the container 2 has been formed, the shaped mould 4 is brought into the extracting position and brings the container 2 with it (FIG. 24). In the case of the second embodiment, the extraction unit 75 is brought into the protruding out position. Up to this point the gripper element 68 has remained outside the pickup position and in the releasing configuration. However, now the gripper element 68 is brought into the pickup position (FIG. 25) and is then switched to the pickup configuration (FIGS. 26 and 43) for gripping the projecting edge 66 of the flange 71 of the container 2. At least in the case of the first embodiment, the subsequent passage of the shaped mould 4 to the home position causes the container 2 to come out of the shaped mould 4 (FIG. 27). The gripper element 68 is then moved to the releasing position (FIG. 28) in which the container 2 is above the conveying device 69 and a short distance away from it. The switching of the gripper element 68 to the releasing configuration causes the container 2 to drop onto the conveying device 69 (FIG. 29).

To avoid risks of interference, at that point the gripper element 68 is lifted (FIG. 30) and then returned near to the pickup position (FIG. 31) where it is again lowered (FIG. 32) and is ready for a new cycle. The lifting and lowering of the gripper element 68 occur by means of a translation of it relative to a second supporting slide 70 with which it is associated.

As already indicated, even the fifth innovative aspect described above may be applied in any apparatus 1, but is particularly advantageous if applied in the case of an apparatus 1, such as that illustrated in the accompanying figures, that comprises a plurality of thermoforming devices 3 that can be operated in a synchronised way for simultaneously thermoforming a corresponding plurality of containers 2, and in which respectively, the shaped moulds 4 and the closing elements 5 of all of the thermoforming devices 3 are side by side and are mechanically connected so that they move in a synchronised way. In fact, in this case, the extracting device 9 comprises a gripper element 68 for each thermoforming device 3, and the movement relative to one another of the shaped mould 4 and of the gripper element 68 of each thermoforming device 3 advantageously occurs simultaneously.

Furthermore, in the case of an apparatus 1 with multiple thermoforming devices 3, at least some of the gripper elements 68 may be side by side along a line of placing side by side and they may also be movable relative to each other (relative to the second supporting slide 70 in the accompanying figures), for varying their distance from each other along that line of placing side by side. That is, in particular, with the aim of allowing variations in the distances from one another between a first configuration that the gripper elements 68 adopt at least in the pickup position, and a second configuration that they can adopt at least in the releasing position. In the embodiment illustrated, in particular, the gripper elements 68 can adopt a second configuration in which they are spaced further apart than in the first configuration, if the conveying device 69 requires the containers 2 to be fed to it with a predetermined distance between them that is greater than that between the various shaped moulds 4.

Finally, although in the accompanying figures there is a single extracting device 9 located on one side of the rotor 36, in other embodiments the thermoforming device 3 may comprise two rows of shaped moulds 4 arranged side by side. In that case, there may be two specular extracting devices 9, which can simultaneously extract the containers 2 of the two rows on opposite sides, and place them on two separate conveying devices. It should be noticed that, to adapt the rest of the apparatus 1 for simultaneously making two rows of containers 2 side by side, it is sufficient to ensure that the rotor 36 has on each of its faces 38 two rows of closing elements 5 positioned side by side, and that the feeding means 7 simultaneously feed two rows of flat sheets 8 positioned side by side to the rotor 36. This result may be obtained by doubling the pickup station 24 and the transferring means, as well as making the feeder 25 feed to the pickup station 24 two rows of flat sheets 8 (for example, by dividing the web 52 into two strips that are then divided to form the flat sheets 8).

Although operation of the apparatus 1 illustrated in the accompanying figures has already been described block by block in the above description, to which reference must therefore be made for the details, below is a brief summary of it in order to highlight the coordination between the various steps.

Figure 8:
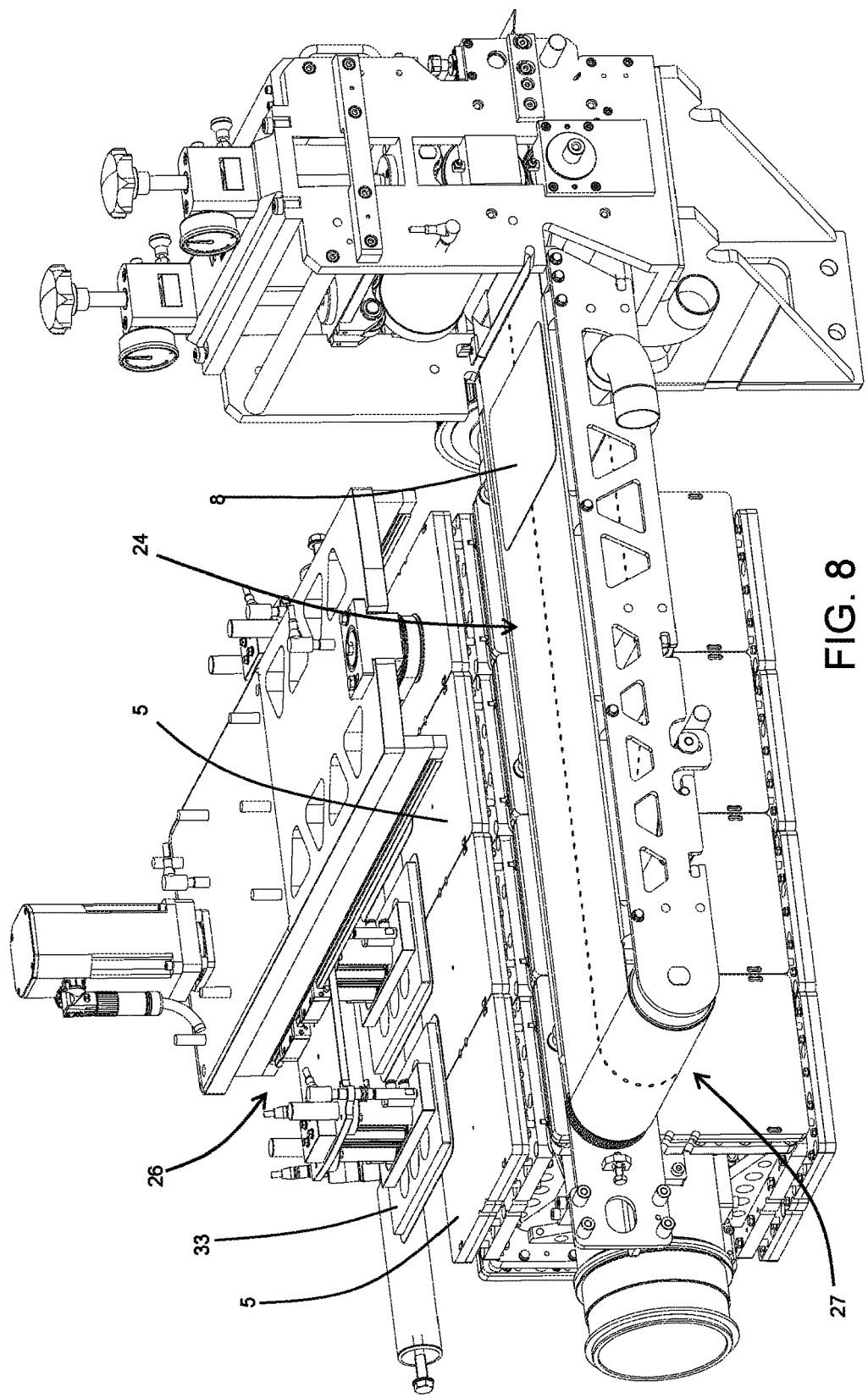

Starting from an initial situation in which all of the pickup locations 28 of the pickup station 24 are occupied by a flat sheet 8 (FIG. 5), the transferring device 26 picks up the flat sheets 8 (FIGS. 6 and 7) and transfers them onto the closing elements 5 of the face 38 of the rotor 36 that is facing upwards (that is to say, those positioned in their second angular position—FIGS. 8 and 9), closing elements 5 that in their previous third angular position had been heated by the heating elements 6 as described below.

As illustrated by the sequence in FIGS. 8, 9, 10 and 5, during the transfer of the flat sheets 8 to the rotor 36, the feeder 25 feeds one after another four new flat sheets 8 to the belt 52 with controlled feed 29, which in turn positions them in the pickup locations 28.

Figure 10:
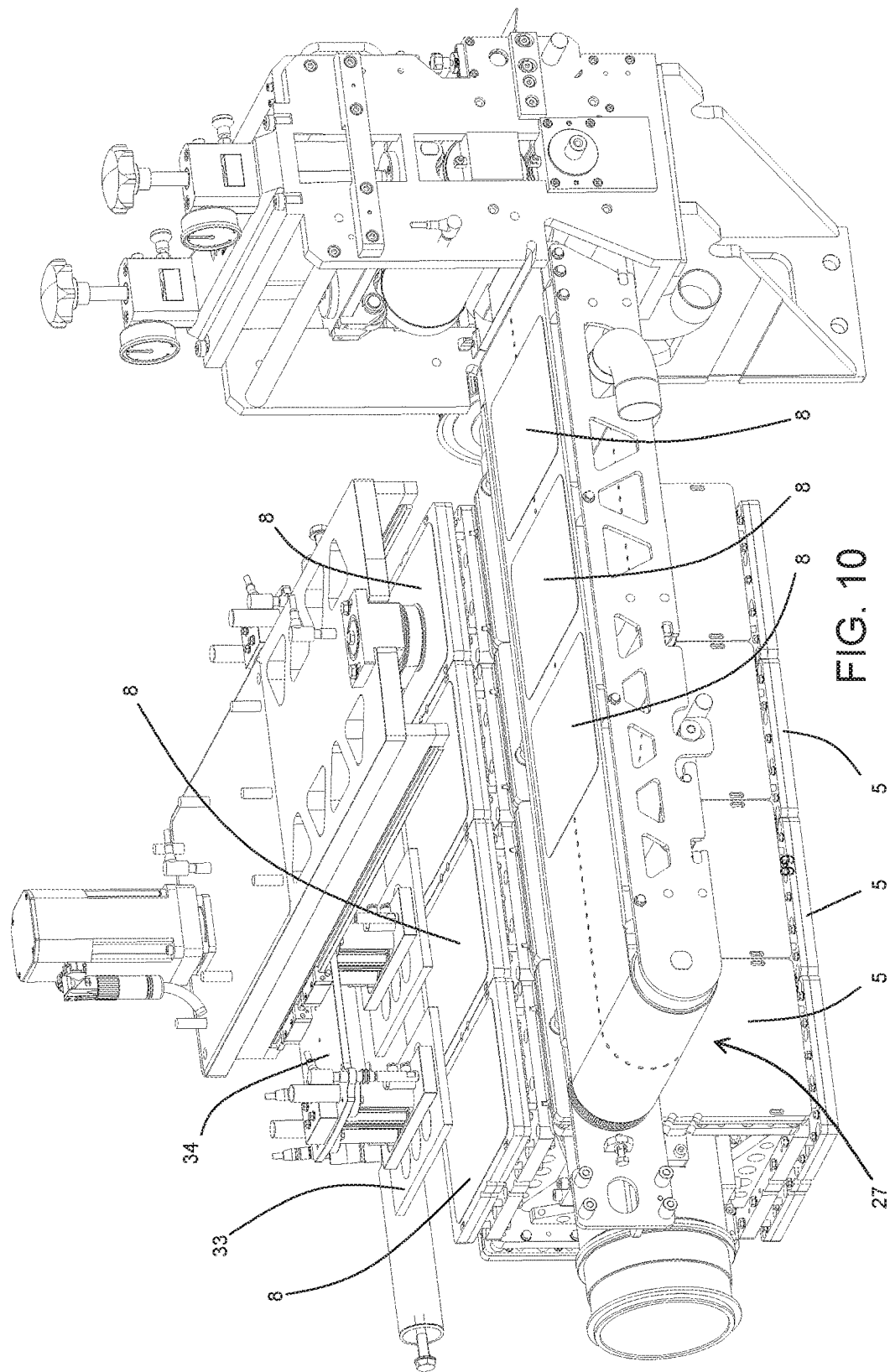
Figure 11:
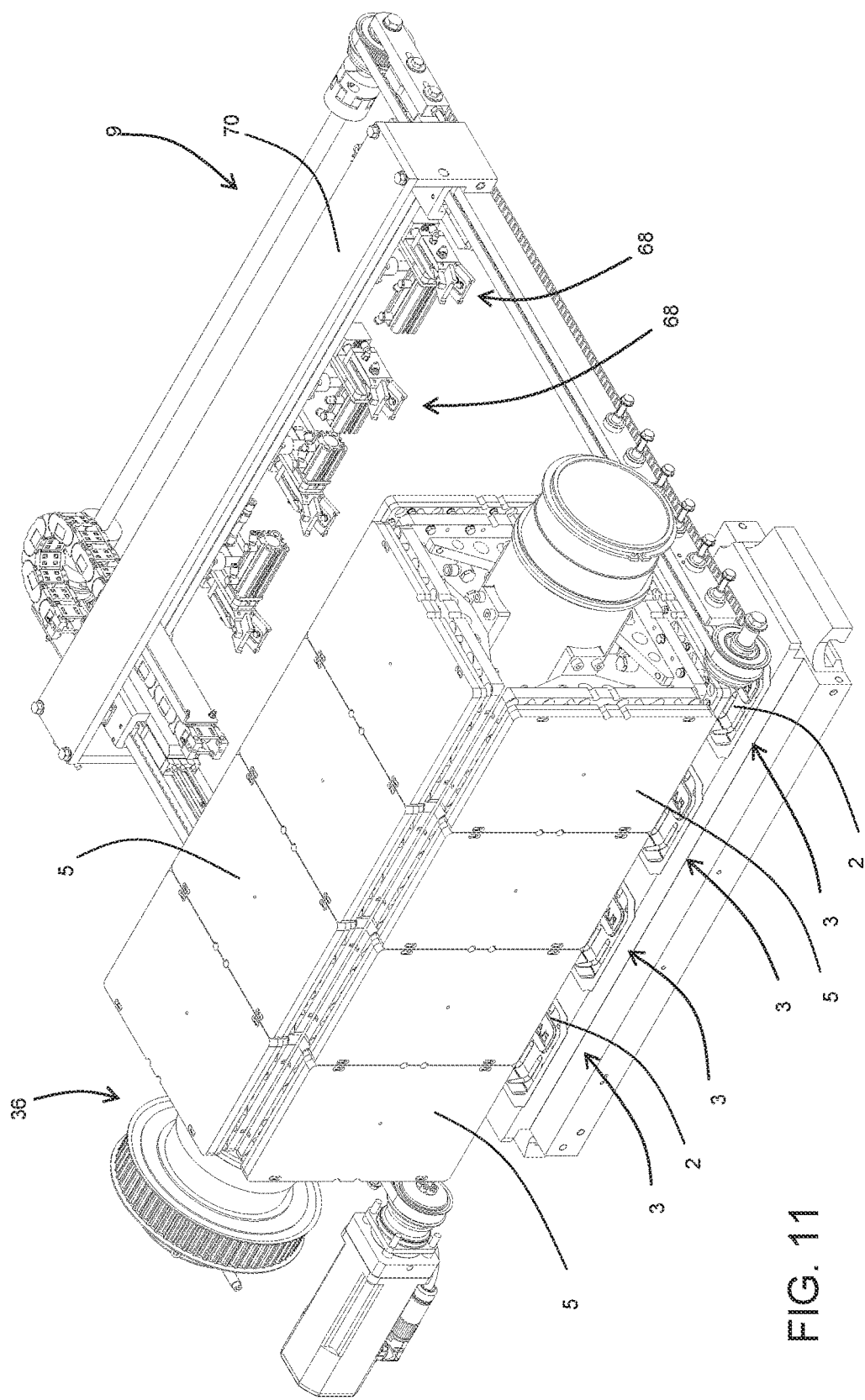
FIG. 11 is an axonometric rear three-quarter view of a different combination of main parts of the apparatus of FIG. 1, which operate in conjunction with each other during several operating steps.
Figure 12:
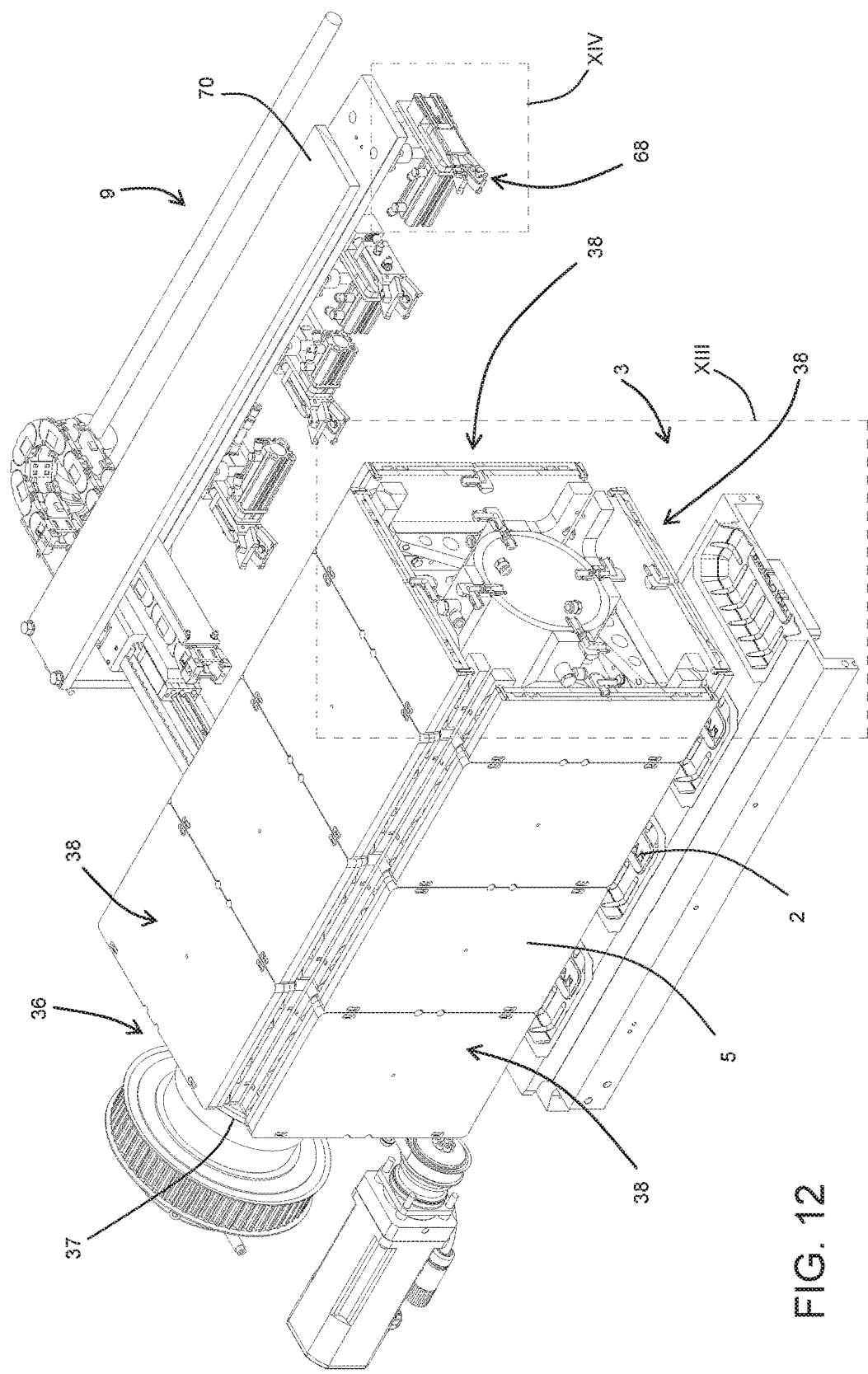
FIG. 12 is an axonometric rear three-quarter view of the main parts of the apparatus of FIG. 11 in cross-section according to a vertical cross-section plane.
Figure 14:
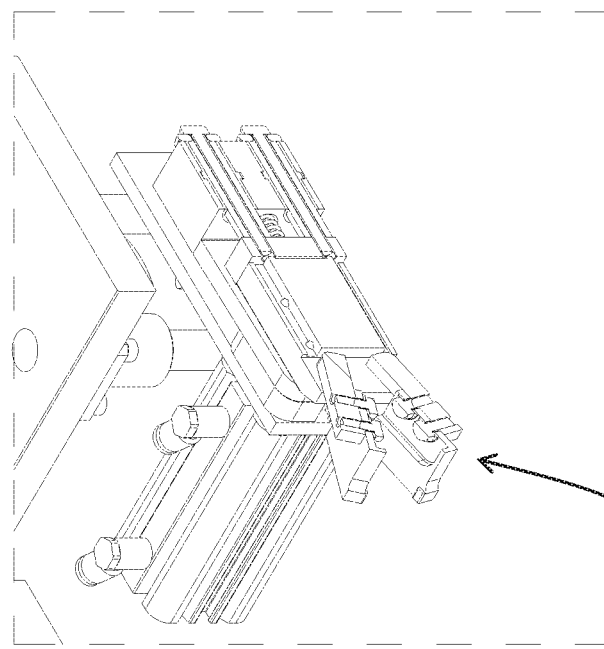
FIG. 14 is an enlarged view of the detail XIV of FIG. 12.

When the transferring device 26 has positioned the flat sheets 8 on the rotor 36 and has moved away from it as illustrated in FIG. 10, the rotor 36 rotates through 90° and brings the flat sheets 8 into the fourth angular position, in which they remain for a predetermined time. Since at any time when the rotor 36 is stationary there are closing elements 5 in all of the angular positions, it is obvious that the dwell time in each angular position is the same and is in use determined by the operation that requires the most time, of the four that take place simultaneously at each angular position. During this dwell time in the fourth angular position, the closing elements 5 transfer the heat previously accumulated to the flat sheets 8, substantially bringing them to the temperature necessary for correct forming. Moreover, while the closing elements 5 are in the fourth angular position, the non-contact temperature measuring devices measure their temperature.

Then the rotor 36 rotates through another 90° and brings the closing elements 5 that retain the flat sheets 8 (closing elements 5 whose feed is being followed), into its own first angular position (FIG. 22).

At that point the shaped mould 4 shifts into the forming position (FIG. 23) and thermoforming of the container 2 takes place (in the known way, by means of a negative pressure or overpressure, depending on requirements). When forming is complete, the shaped mould 4 is brought into the extracting position and the gripper elements 68 intervene, picking up the container 2 and placing it on the conveying device 69 (FIGS. 24 to 32). When the moulds have reached the home position and the containers 2 are far enough away from the rotor 36, the latter can rotate through a further 90° and bring the closing elements 5 into the third angular position. At that point, if present, the heating bodies 40 pass from the uncoupled position (FIG. 16) to the coupled position (FIG. 15) for heating the closing elements 5 for a predetermined time. When that predetermined heating time has ended, the heating bodies 40 are returned to the uncoupled position (FIG. 16) and the rotor 36 can rotate through a further 90° and return to the initial position of FIG. 5. In contrast, where the outer heating bodies 40 are not present, there being only one or more heating elements 6 in the rotor 36, these may heat the closing elements 5 continuously and irrespective of the angular position.

It should be noticed that in all of the steps described above that involve transferring the flat sheets 8 between two parts that are equipped with a suction retaining system (pickup station 24, transferring device 26, closing elements 5, shaped mould 4), it is always generally the case that during the transfer there is a stop in the suction by the part that releases the flat sheets 8 and an activation of the suction by the part that receives the flat sheets 8. This invention brings important advantages.

In fact, thanks to this invention, it has been possible to provide an apparatus for thermoforming plastic containers that can guarantee productivity that is considerably higher than that of similar prior art apparatuses.

Finally, it should be noticed that this invention is relatively easy to produce and that even the cost linked to implementing the invention is not very high. The invention described above may be modified and adapted in several ways without thereby departing from the scope of the inventive concept.

All details may be substituted with other technically equivalent elements and the materials used, as well as the shapes and dimensions of the various components, may vary according to requirements.

The invention claimed is:

1. An apparatus for thermoforming plastic containers comprising:
   a pickup station (24);
   a feeder (25) for feeding flat sheets (8) of thermoformable plastic material to the pickup station (24);
   a thermoforming device (3) in turn comprising a shaped mould (4) and a closing element (5), the shaped mould (4) and the closing element (5) being movable relative to each other at least between a home position in which they are away from one another, and a forming position in which they are near to each other for, in use, clamping a flat sheet (8) between them; the closing element (5) comprising a resting surface (16) that is facing the shaped mould (4) at least when they are in the forming position, and being equipped with suction means designed to retain on the resting surface (16) at least one of said flat sheets (8) at least when the shaped mould (4) and the closing element (5) are in the home position;
   one or more heating elements (6) for heating the closing element (5);
   a transferring device (26) for transferring the flat sheets (8) from the pickup station (24) to the closing element (5);
   an extracting device (9) for extracting the thermoformed container (2) from the shaped mould (4); and
   an electronic unit (10) for controlling and checking operation of the apparatus (1);
   characterised in that:
   it comprises a plurality of said thermoforming devices (3), each in turn comprising a shaped mould (4) and a closing element (5), the shaped moulds (4) and the closing elements (5) of said plurality of thermoforming devices (3) being simultaneously movable at least between the corresponding home and forming positions, and the closing elements (5) of said plurality of thermoforming devices (3) having fixed first mutual positions at least when they are in the home position;
   the pickup station (24) comprises a positioning device (27) for, in use, positioning a plurality of flat sheets (8) arriving from the feeder (25), in a plurality of pickup locations (28) mutually arranged with second mutual positions, the number of pickup locations (28) being equal to the number of thermoforming devices (3); and
   the transferring device (26) is designed to simultaneously transfer a plurality of flat sheets (8) positioned in the pickup locations (28) to the closing elements (5).

2. The thermoforming apparatus according to claim 1, characterised in that the positioning device (27) comprises at least one belt (52) with controlled feed (29) which is synchronised with the feeder (25) and which comprises an upper portion (30) on which said pickup locations (28) are defined.

3. The thermoforming apparatus according to claim 2, characterised in that said pickup locations (28) are arranged one after another along a line of feed of said belt (52) with controlled feed (29).

4. The thermoforming apparatus according to claim 2, characterised in that at least at said upper portion (30) the belt (52) with controlled feed (29) is a suction belt (52).

5. The thermoforming apparatus according to claim 1, characterised in that it comprises a rotor (36) rotatable about an axis of rotation, said closing elements (5) being mounted on the rotor (36), the rotor (36) being rotatable at least between a first predetermined angular position in which the closing elements (5) are facing corresponding shaped moulds (4), and a second predetermined angular position in which the closing elements (5) can receive the flat sheets (8) from the transferring device (26).

6. The thermoforming apparatus according to claim 5, characterised in that when passing from the first predetermined angular position to the second predetermined angular position, the rotor (36) also adopts a third predetermined angular position in which the one or more heating elements (6) heat the closing elements (5), and in that, when passing from the second predetermined angular position to the first predetermined angular position, the rotor (36) also adopts a fourth predetermined angular position in which the closing elements (5) transfer heat to the flat sheets (8).

7. The thermoforming apparatus according to claim 5, characterised in that each thermoforming device (3) comprises a number of closing elements (5) equal to the number of predetermined angular positions of the rotor (36), the closing elements (5) of each thermoforming device (3) being positioned in such a way that when one closing element (5) is in one predetermined angular position, the other closing elements (5) of the same thermoforming device (3) are in the other predetermined angular positions.

8. The thermoforming apparatus according to claim 5, characterised in that said closing elements (5) which are simultaneously movable between the corresponding home and forming positions, are aligned along a line parallel to the axis of rotation.

9. The thermoforming apparatus according to claim 1, characterised in that the transferring device (26) comprises either a single pierced suction plate (33) or a plurality of pierced suction plates (33), the single pierced suction plate (33) or said plurality of pierced suction plates (33) being movable between a pickup position in which they are facing the pickup station (24), and a releasing position in which they are facing the closing elements (5).

10. The thermoforming apparatus according to claim 1, characterised in that the shaped mould (4) and a corresponding closing element (5) which are positioned in the home position, are shiftable into the forming position by means of a movement of the shaped mould (4) towards the closing element (5).

11. The thermoforming apparatus according to claim 1, characterised in that it also comprises, for each thermoforming device (3), at least one temperature measuring device connected to the electronic unit (10) and positioned in such a way that it measures the temperature of the related closing element (5).

12. The thermoforming apparatus according to claim 1, characterised in that at least two of the closing elements (5)

which are simultaneously movable between the corresponding home and forming positions, are constituted of a single rigid element.

13. The thermoforming apparatus according to claim 12, characterised in that all of the closing elements (5) which are simultaneously movable between the corresponding home and forming positions, are constituted of a single rigid element.

14. The thermoforming apparatus according to claim 13, characterised in that said single rigid element is a flat body.

15. The thermoforming apparatus according to claim 12, characterised in that said single rigid element is a flat body.

* * * * *